US012549969B2

(12) United States Patent
Shrivastava et al.

(10) Patent No.: US 12,549,969 B2
(45) Date of Patent: Feb. 10, 2026

(54) METHOD AND APPARATUS FOR HANDLING ARTIFICIAL INTELLIGENCE/MACHINE LEARNING FUNCTIONALITY OR FEATURE (RE)CONFIGURATION IN A TELECOMMUNICATIONS NETWORK

(71) Applicant: Sharp Kabushiki Kaisha, Sakai (JP)

(72) Inventors: Rudraksh Shrivastava, Erligheim (DE); Tomoki Yoshimura, Camas, WA (US); Zhanping Yin, Vancouver, WA (US); Atsushi Ishii, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 281 days.

(21) Appl. No.: 18/448,064

(22) Filed: Aug. 10, 2023

(65) Prior Publication Data

US 2025/0056249 A1 Feb. 13, 2025

(51) Int. Cl.
*H04W 24/02* (2009.01)
*H04L 41/16* (2022.01)

(52) U.S. Cl.
CPC ............ *H04W 24/02* (2013.01); *H04L 41/16* (2013.01)

(58) Field of Classification Search
None
See application file for complete search history.

(56) References Cited

U.S. PATENT DOCUMENTS

| 2023/0305901 A1* | 9/2023 | Vinson | G06F 9/4893 |
| 2024/0080245 A1* | 3/2024 | Lee | H04L 41/14 |
| 2024/0172080 A1* | 5/2024 | Ali | H04W 36/362 |

OTHER PUBLICATIONS

U.S. Appl. No. 18/448,040, filed Aug. 10, 2023 entitled "Method and Apparatus for Handling Artificial Intelligence/Machine Learning Functionality or Feature (Re)Configuration in a Telecommunications Network".

(Continued)

*Primary Examiner* — Angela Nguyen
(74) *Attorney, Agent, or Firm* — NIXON & VANDERHYE P.C.

(57) ABSTRACT

A wireless terminal which communicates over a radio interface with a radio access network comprises receiver circuitry and processor circuitry. The receiver circuitry is configured to receive, over the radio interface from the radio access network, at least a first message which concerns implementation of an Artificial Intelligence/Machine Learning (AI/ML) Functionality/feature for the wireless terminal. The processor circuitry is configured: to make a determination that the reception of the first message requires one of the following: an update of an existing model for the Artificial Intelligence/Machine Learning (AI/ML) Functionality/feature; a download of a new model for the Artificial Intelligence/Machine Learning (AI/ML) Functionality/feature for a particular functionality or feature; and to make a determination that a pause maybe necessary to implement the Artificial Intelligence/Machine Learning (AI/ML) Functionality/feature. In an example optional implementation, the processor circuitry may also be further configured to generate a pause notification message.

15 Claims, 10 Drawing Sheets

(56) References Cited

OTHER PUBLICATIONS

R1-230xxxx—3GPP TSG RAN WG1 #113, Incheon, Korea, May 22-May 26, 2023, Title: Session notes for 9.2 (Study on AI/ML for NR air interface), Source: Ad-hoc Chair (CMCC), 34 pp.
R2-2xxxxxx—3GPP TSG-RAN WG2 Meeting #122, Incheon, Korea, May 22-26, 2023, Source: RAN2 Chairman (MediaTek), Title: Chair Notes, 119 pp.
R1-2305327—3GPP TSG-RAN WG1 Meeting #113, Incheon, KR, May 22-May 26, 2023, Agenda item: 9.2.1, Source: Qualcomm Incorporated, Title: General Aspects of AI/ML Framework, 41 pp.
U.S. Appl. No. 18/296,799, filed Apr. 6, 2023 entitled "Network Configured Operation of User Equipment With Artificial Intelligence/ Machine Learning Model Capability."
Rakuten Mobile Inc., Discussion on AI/ML Model Life Cycle Management, 3GPP TSG RAN WG1 #110 R1-2207117, Aug. 12, 2022, section 3, 9 pp.

* cited by examiner

METHOD AND APPARATUS FOR HANDLING ARTIFICIAL INTELLIGENCE/MACHINE LEARNING FUNCTIONALITY OR FEATURE (RE)CONFIGURATION IN A TELECOMMUNICATIONS NETWORK

TECHNICAL FIELD

The technology relates to wireless communications, and particularly to telecommunications nodes such as access nodes and mobile stations, e.g., wireless terminals, that utilize artificial intelligence (AI) and/or machine learning (ML).

BACKGROUND

A radio access network typically resides between wireless devices, such as user equipment (UEs), mobile phones, mobile stations, or any other device having wireless termination, and a core network. Example of radio access network types includes the GERAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of an access node or base station may include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 1, and is also described in 3GPP TS 38.300. The 5G NR network is comprised of NG-RAN, Next Generation Radio Access Network, and 5GC, 5G Core Network. As shown, NG-RAN is comprised of gNBs, e.g., 5G Base stations, and ng-eNBs, i.e., LTE base stations. An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations, i.e., gNB & ng-eNB. A gNB node provides NR user plane and control plane protocol terminations towards the UE, and is connected via the NG interface to the 5GC. The 5G NR, New Radio, gNB is connected to AMF, Access and Mobility Management Function, and UPF, User Plane Function, in the 5GC, 5G Core Network.

In general, "artificial intelligence" (AI) refers to processes and algorithms that are able to simulate human intelligence, including mimicking cognitive functions such as perception, learning and problem solving or refers to a data driven algorithm that applies to techniques to generate a set of outputs based on a set of inputs. Artificial intelligence includes the concept of artificial intelligence (AI) models, which pertain to, e.g., the creation, training, and deployment of machine learning algorithms that emulate logical decision-making based on available data. An AI "model" may be an algorithm which can be trained online (e.g., the AI model may be trained in real time/live conditions using real time data) or offline (e.g., the AI model may have been trained before being deployed) and/or which, e.g., emulates logical decision making or prediction making based on available data with minimal or no human intervention. A "model" may also be considered as a data driven algorithm that applies AI/ML techniques to generate a set of outputs based on a set of inputs. Machine learning (ML) is a subset of AI. ML may include applications of AI that allow machines to extract knowledge from data and learn from it autonomously. As summarized below, use of artificial intelligence (AI) and/or machine learning (ML) have been envisioned to a limited degree for telecommunications.

For example, in RAN1 #111 the following were agreed:
For UE-part/UE-side models, study the following mechanisms for Life Cycle Management (LCM) procedures:
  For functionality-based LCM procedure: indication of activation/deactivation/switching/fallback based on individual AI/ML functionality.
    Note: UE may have one AI/ML model for the functionality, or UE may have multiple AI/ML models for the functionality.
    FFS: Whether or how to indicate Functionality
  For model-ID-based LCM procedure, indication of model selection/activation/deactivation/switching/fallback based on individual model IDs.

Additionally, as discussed in functionality and model identification, RAN1 #112-bis-e provides the following agreement:
  For AI/ML functionality identification and functionality-based LCM of UE-side models and/or UE-part of two-sided models:
    Functionality refers to an AI/ML-enabled Feature/FG enabled by configuration(s), where configuration(s) is(are) supported based on conditions indicated by UE capability.
    Correspondingly, functionality-based LCM operates based on, at least, one configuration of AI/ML-enabled Feature/FG or specific configurations of an AI/ML-enabled Feature/FG.
      FFS: Signaling to support functionality-based LCM operations, e.g., to activate/deactivate/fallback/switch AI/ML functionalities
      FFS: Whether/how to address additional conditions (e.g., scenarios, sites, and datasets) to aid UE-side transparent model operations (without model identification) at the Functionality level
      FFS: Other aspects that may constitute Functionality
    FFS: which aspects should be specified as conditions of a Feature/FG available for functionality will be discussed in each sub-use-case agenda.
  For AI/ML model identification and model-ID-based LCM of UE-side models and/or UE-part of two-sided models:
    model-ID-based LCM operates based on identified models, where a model may be associated with specific configurations/conditions associated with UE capability of an AI/ML-enabled Feature/FG and additional conditions (e.g., scenarios, sites, and datasets) as determined/identified between UE-side and NW-side.
    FFS: Which aspects should be considered as additional conditions, and how to include them into model description information during model identification will be discussed in each sub-use-case agenda.

FFS: Relationship between functionality and model, e.g., whether a model may be identified referring to functionality(s).

FFS: relationship between functionality-based LCM and model-ID-based LCM

Note: Applicability of functionality-based LCM and model-ID-based LCM is a separate discussion.

The initial set of use cases and their respective sub-use cases considering aspects such as performance, complexity, and potential specification impact as agreed by RAN-1 [4] includes:

CSI feedback enhancement, e.g., overhead reduction, improved accuracy, prediction Spatial-frequency domain CSI compression using two-sided AI model.

Time domain CSI prediction using UE-sided model.

Beam management, e.g., beam prediction in time, and/or spatial domain for overhead and latency reduction, beam selection accuracy improvement Spatial-domain DL beam prediction, with UE-sided or NW-sided AI model Temporal DL beam prediction, with UE-sided or NW-sided AI model Positioning accuracy enhancements for different scenarios including, e.g., those with heavy NLOS conditions.

Direct AI/ML positioning (i.e., the AI/ML model is directly producing the UE location as output)

Assisted AI/ML positioning (i.e., the AI/ML model is producing an existing or new measurement report that is used to estimate the UE location using legacy positioning methods)

In RAN2 #119bis, it was agreed: R2 assumes that a model is identified by a model ID. Its usage is FFS. R2 assumes that from Management or Control point of view mainly some meta info about a model may need to be known, details FFS.

Considering the above agreements and working assumptions, in RAN-1 and RAN-2 it is being discussed that a wireless terminal, e.g., UE, may identify an AI/ML model using a model ID and functionality.

Two approaches for AI/ML Life Cycle Management (LCM) have been identified so far in the 3GPP RAN-1/2 discussions, namely Model-ID based LCM and the Functionality-based LCM.

In Model-ID based LCM, the AI/ML functionality and the associated model are identified by an explicit model ID. In this case, the model ID is mapped to an AI/ML model or algorithm. Thus, the UE may report its artificial intelligence (AI)/machine learning (ML) capability by including the model identifier(s), e.g., model ID(s), for the supported models to the gNB. With this information, the gNB may provide the corresponding LCM assistance utilizing model ID. For transferring the model, the model ID may be used for model identification which may help in selecting a target model for downloading or uploading. For example, model ID may be used for switching, (de) activating or monitoring performance of AI models.

In Functionality-based LCM, by contrast, the functionality is used to point to a model. In other words, functionality is mapped to the model and model is identified via the associated functionality. For example, the supported functionalities, e.g., use case, configuration, scenario, for a certain use case, e.g., e.g., channel estimation, positioning or beamforming, can be specified. Then, the UE may report its capability in relation to the specified functionality. Thus, the network can assign a model ID corresponding to the supported functionality in an implicit manner. This approach is comparable to legacy approach for capability report and corresponding RRC configurations.

Considering, e.g., the foregoing, for AI/ML model-ID based LCM purpose, the UE may report its AI/ML capability to the network for model (de) activation, switching, fallback procedure. A UE may have the capability to support AI/ML operations and model-ID based LCM which may be fixed, but its ability at different times to support AI/ML model or associated functionality and meet related performance key performance indicators, KPIs, may be different depending on device performance key performance indicators, KPIs, such as live run-time capabilities, environment, device type, use-case, scenario, device computation usage, power-consumption, antenna configuration etc. The AI/ML model must adapt to the dynamic run-time capabilities of the UE such as RF and Power/resource consumption status etc. Also, the UE may need to optimize its hardware and software resources to support various models and their functions associated to intended use-cases. Such optimizations are critical to consistently meet model and device performance KPIs.

A UE or a device may need to support one or more AI/ML based models/functionality and match the expected model performance KPIs. But at certain times due to the limitations of the device hardware/software resources and/or network side limitations (e.g., signaling delay, resource allocation, model transfer etc.), it may not be able to always support a specific AI/ML model(s) or functionality. Also, the gNB may not configure the UE with more AI/ML models or functionalities beyond UE's capabilities to support it at a given time. Thus, at a given time, gNB may not be aware of real time UE capabilities to support a model or functionality, associated with a target use case. These and other issues, including reporting to the network the wireless terminal's status or live run-time capabilities to be able to support AI/ML models and related functionalities at a given time, are addressed at least in part in U.S. patent application Ser. No. 18/296,799 to SHIRIVASTAVA, filed Apr. 6, 2023, entitled "Network Configured Operation of User Equipment With Artificial Intelligence/Machine Learning Model Capability", which is incorporated herein by reference in its entirety.

In accordance with agreements such as those mentioned above, for example, the identification of the conditions for supported functionalities of a given sub-use case, ML-enabled feature has been left for future study, "FFS".

There are on-going discussions in RAN1/2 that knowing UE conditions at the network is necessary for functionality identification and functionality-based Life Cycle Management (LCM). Such UE conditions may include, for example, scenarios in which the UE may operate, sites where the UE may be located, the UE configuration, UE data sets and UE parameters including both AI/ML-model and UE configuration parameters, and/or the UE battery status. Knowing the UE conditions is required to reveal the background (UE) conditions when using ML models for supporting a given ML-enabled feature(s). Scenario based information may include but is not limited to the following aspects, e.g.: if the UE is in an urban city, the network may deliver models for the urban city; and if the UE is in rural town, the network may deliver models for the rural town to the UE. For example, if the UE's battery is low, the network may tell the UE to fallback to the legacy procedure without ML-enabled feature(s). As used herein "fallback to legacy procedure" may refer to falling back to non-AI/ML 3GPP procedures or mechanisms.

These conditions may vary depending on the different sub-use cases. It is anticipated that at least one common set of conditions may be derived across all the sub-use cases that are being discussed in Rel-18. A "common set of conditions" is those in which the parameter definitions are common, but the parameter values may differ depending on the Functionality or Feature.

A subset of conditions can be used to identify each Functionality, although this does not exclude the reuse of specific conditions across sets and/or Functionalities. The specific conditions can further be classified into essential conditions and additional conditions. "Additional conditions" may include, for example, conditions which are good to have but are not necessary. In other words, (1) the UE may report conditions/functionalities that can be immediately configured or activated, in addition to (2) the UE may further update the applicable functionalities that can be configured/activated, for example, once the underlying models are delivered/transferred or depending on a specific scenario, e.g., macro, urban, rural etc.

In Functionality-based LCM, UE capability signaling, and configuration ought to behave similarly to the features that are already in place in the legacy system. The AI/ML-enabled features' overall fixed setup to support NG-RAN RRC configurations may be indicated by the UE capability signaling. The possible supported settings at the UE can be represented by the overall/selective configurations for AI/ML-enabled features. The network can customize the subset of supported identified AI/ML capabilities after identifying the supported functionality through static set/selective configuration for AI/ML-enabled features.

However, the network can be informed dynamically as to whether a subset of configured functionality at a given time for a given scenario can be supported to the UE or not. This could be due to a variety of reasons such as battery status, availability of the underlying models enabling the capability, and/or other reasons. This depends on the UE's assessment and when it informs whether the present functions are applicable. It is therefore possible that the network can only activate the configured functions after receiving feedback from the UE on whether they are applicable or not. Alternatively, if the circumstances or scenario change and the gNB reconfigures the UE to switch to a different functionality than the one it is currently using, the UE might not have the appropriate or most recent model for that functionality and may need to download or update the model before the functionality can be activated.

In on-going RAN1/2 discussion the current understanding is that the network can activate/deactivate/switch/fallback/update among the applicable functionalities. The LCM steps of activate/deactivate/switch/fallback/update are made by changing the configuration of the UE. Thus, the activate/deactivate/switch/fallback/update, etc., of AI/ML functionalities would be handled via UE (re)configuration. Thus, if a functionality is switched or de-activated by UE re-configuration considering the set of supported/applicable conditions at a given time, this may implicitly instigate or trigger UE to activate/deactivate/switch/fallback/update the underlying AI/ML model supporting/part of the corresponding functionality.

Acts such as instigating or triggering a UE to activate/deactivate/switch/fallback/update the underlying AI/ML model supporting/part of the corresponding functionality may be problematic. For example, considering UE-side or UE-side of the two-sided model, since the UE has limited storage capacity, the UE may not have all the AI/ML models associated to a functionality supported by the UE. It is also possible that the models that are stored at the UE side may not be fully up to date. The UE(s) may support a feature or functionality but may not update or download all the specialized models for the supported functionality. Therefore, for the AI/ML model-ID based LCM, to switch functionalities based on one or more of the following cases may be considered:

It is possible that the network may activate the configured functions after receiving feedback from the UE on whether they are applicable or not. Then before activating or switching the functionality, the network needs to check with the UE the AI/ML supported capabilities/features or functionalities at a given time. This may lead to additional signaling and delay.

If the conditions or scenario change, and the gNB reconfigure the UE to switch to a different functionality than the existing one, the UE may not have the appropriate or updated model for that functionality and may need to download the model or update the model before the functionality can be activated. The UE may need to indicate and confirm this with the gNB. The model activate/deactivate/switch/update/download maybe transparent to the network.

A UE may have one or more models for a given functionality, and it is possible that not all the models are up to date.

Before switching to a new model for a given functionality with/without the functionality change, the UE may need to check the latest version of the AI/ML model.

If more than one AI/ML enabled functionalities are active at a given time, any conditions reported by the UE should not conflict with the operation of the other functionality.

Thus, the above cases could lead to delays in inferencing and model monitoring and may also lead to performance loss if the existing functionality in use is not able to perform up to the target KPIs.

What is needed are, e.g., methods, apparatus, and/or techniques which enables wireless communication. For example, what is needed are e.g., methods, apparatus, and/or techniques which address such issues, e.g., to avoid latency and delays in AI/ML model inference and monitoring and avoid any model/UE performance degradation or interruptions in AI enabled feature operation.

SUMMARY

In one of its example aspects the technology disclosed herein concerns a network including one or more nodes and which comprises processor circuitry and interface circuitry. The processor circuitry is configured to generate at least a first message which concerns implementation of an Artificial Intelligence/Machine Learning (AI/ML) Functionality for a wireless terminal served by the network. The interface circuitry is configured to transmit the first message over a radio interface and to handle at least a second message which is communicated over the radio interface between the network and the wireless terminal, the second message being configured to indicate at least a potential delay associated with the implementation of the Artificial Intelligence/Machine Learning (AI/ML) Functionality at the wireless terminal. Methods of operating such network and nodes are also provided.

In another of its example aspects the technology disclosed herein concerns a wireless terminal which communicates over a radio interface with a radio access network. In an example embodiment and mode, the wireless terminal comprises receiver circuitry and processor circuitry. The receiver circuitry ix configured to receive, over the radio interface from the radio access network, at least a first message which concerns implementation of an Artificial Intelligence/Machine Learning (AI/ML) Functionality for the wireless terminal. The processor circuitry is configured to determine at least a potential delay associated with implementation of the Artificial Intelligence/Machine Learning (AI/ML) Functionality at the wireless terminal. The processor circuitry is optionally further configured to generate at least a second message configured to notify the radio access network of the at least potential delay, in which case the wireless terminal further comprises transmitter circuitry configured to transmit the second message to the radio access network over the radio interface. Methods of operating such wireless terminals are also provided.

In another of its example aspects the technology disclosed herein concerns a wireless terminal which communicates over a radio interface with a radio access network. In an example embodiment and mode, the wireless terminal comprises receiver circuitry and processor circuitry. The receiver circuitry is configured to receive, over the radio interface from the radio access network, at least a first message which concerns implementation of an Artificial Intelligence/Machine Learning (AI/ML) Functionality/feature for the wireless terminal. The processor circuitry is configured: to make a determination that the reception of the first message requires one of the following: an update of an existing model for the Artificial Intelligence/Machine Learning (AI/ML) Functionality/feature; a download of a new model for the Artificial Intelligence/Machine Learning (AI/ML) Functionality/feature for a particular functionality or feature; and to make a determination that a pause maybe necessary to implement the Artificial Intelligence/Machine Learning (AI/ML) Functionality/feature. In an example optional implementation, the processor circuitry may also be further configured to generate a pause notification message configured to notify the radio access network to pause implementation of the Artificial Intelligence/Machine Learning (AI/ML) Functionality/feature, in which case the wireless terminal comprises transmitter circuitry configured to transmit the pause notification message to the radio access network over the radio interface. Methods of operating such wireless terminals are also provided.

In yet another of its example aspects the technology disclosed herein concerns a network including one or more nodes which comprises processor circuitry and interface circuitry. The processor circuitry is configured to generate at least a first message which one of the following: an update of an existing model for the Artificial Intelligence/Machine Learning (AI/ML) Functionality/feature; a download of a new model for the Artificial Intelligence/Machine Learning (AI/ML) Functionality/feature for a particular functionality or feature. The interface circuitry is configured to transmit the first message to a wireless terminal over a radio interface and to receive from the wireless terminal over the radio interface a pause notification message configured to notify the network to pause implementation of the update of the existing model or the download of the new model. Methods of operating such networks and nodes are also provided.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

Figure 2:
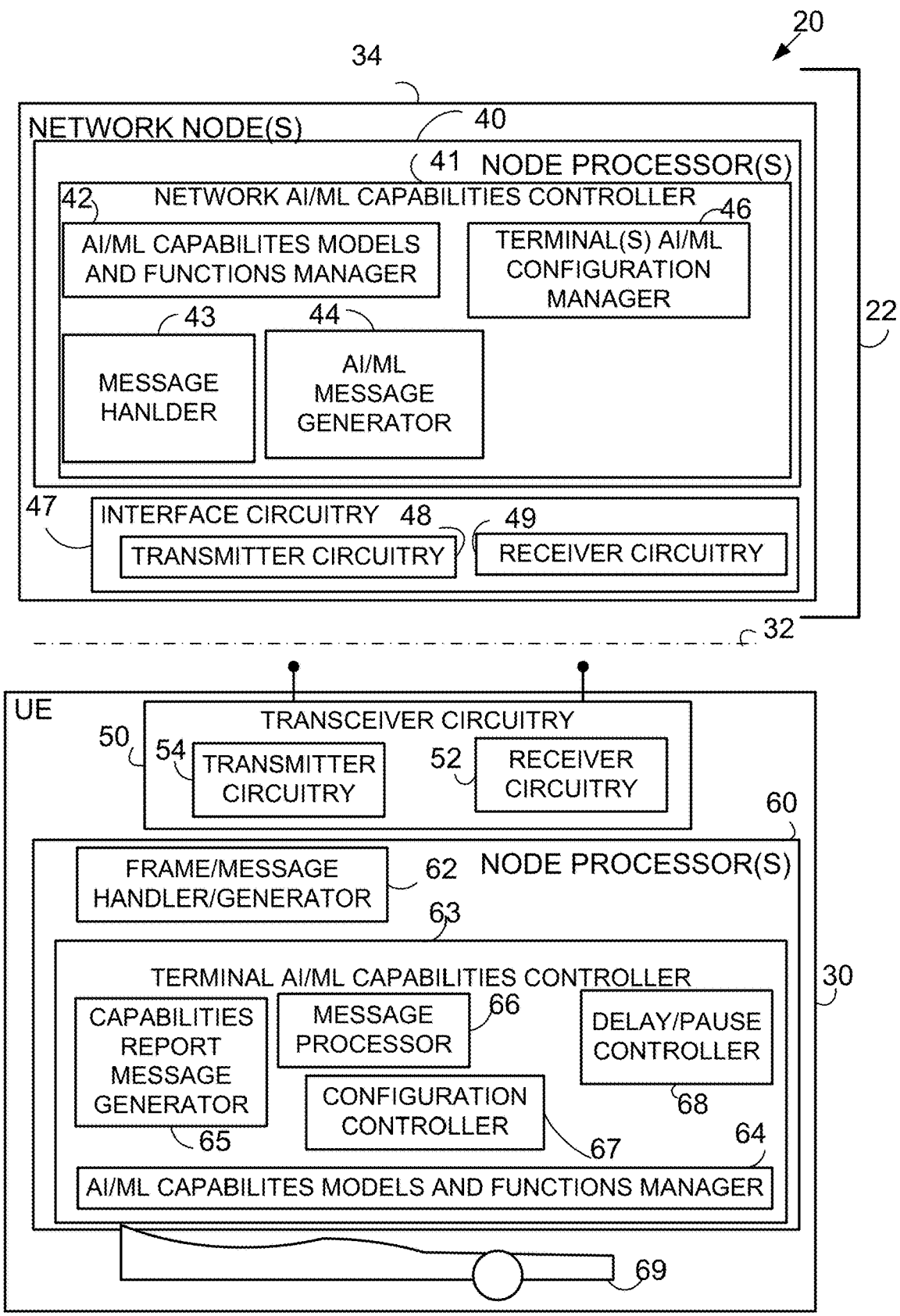
FIG. 2 is a schematic view of an example embodiment and mode of a communications system in which a wireless terminal has artificial intelligence/machine learning model capability and in which a delay or pause for implementation of an Artificial Intelligence/Machine Learning (AI/ML) model or functionality may be determined to be necessary and optionally notified to other entities of the network.

FIG. 2 shows communications system 20 which comprises communication network 22. As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel. All or a subset of the cell may be adopted by 3GPP as licensed bands, e.g., frequency band, to be used for communication between a base station, such as a Node B, and a UE terminal. A cellular network using frequency bands can include configured cells. Configured cells can include cells of which a UE terminal is aware and in which it is allowed by a base station to transmit or receive information. Examples of cellular radio access networks include E-UTRAN or New Radio, NR, and any successors thereof, e.g., NUTRAN.

Figure 3:
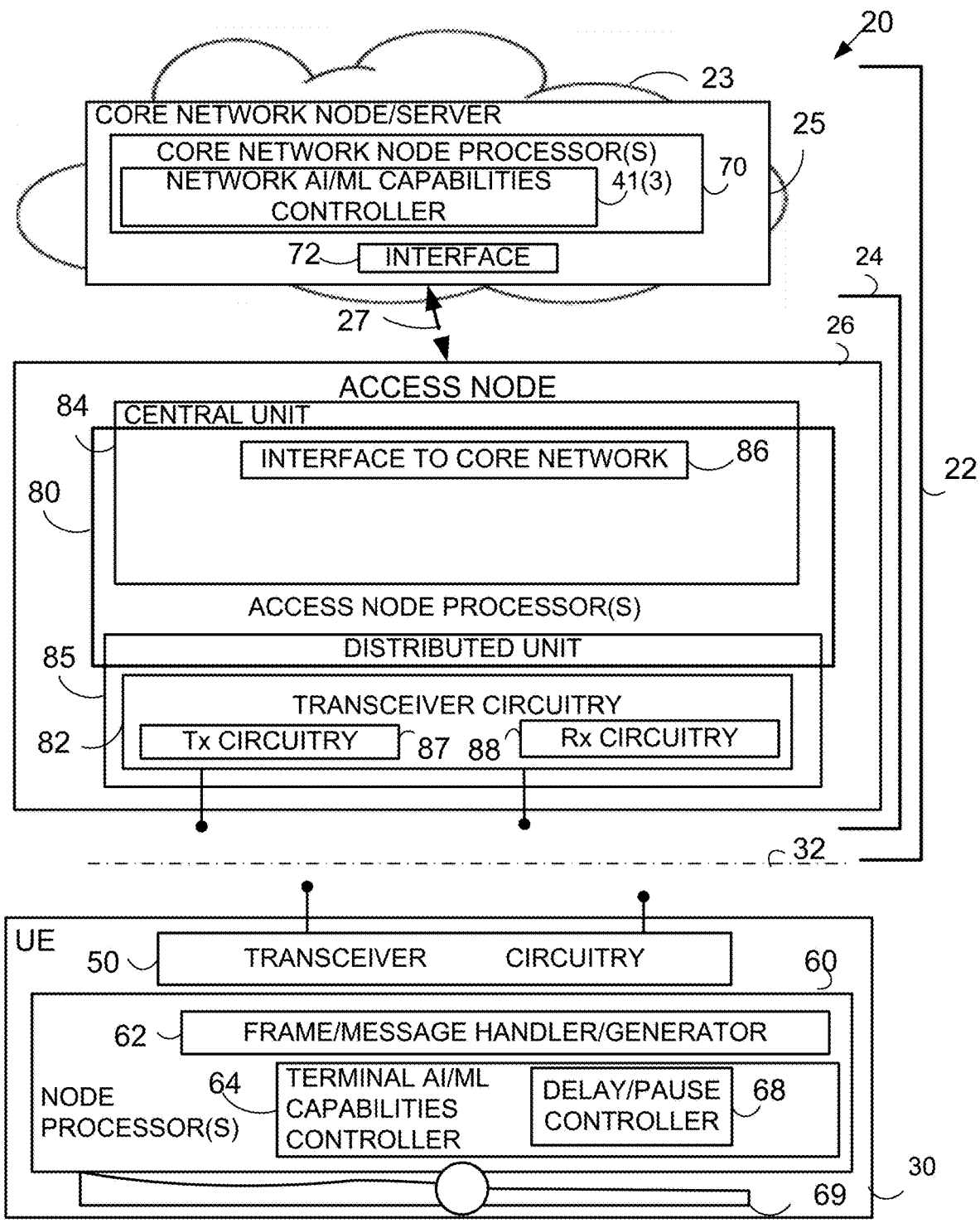
FIG. 3 is a schematic view of an example implementation of the first example embodiment and mode of FIG. 2 in which the network node is a core network node.

As understood, e.g., with reference to FIG. 3, the communication network 22 typically comprises at least one core network 23 and one radio access network 24. The core network 23 may comprise one or more core network nodes or servers, such as core network node 25 shown in FIG. 3. A core network, CN, such as core network (CN) 23 may comprise numerous servers, routers, and other equipment. As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc. For example, core network (CN) 23 may comprise one or more management entities, which may be an Access and Mobility Management Function, AMF.

Also as understood, e.g., with reference to FIG. 3, the communication network 22 typically comprises at least one radio access network 24. The radio access network 24 typically comprises one or more access nodes, such as access node 26 shown in FIG. 3. The radio access network 24, and hence its access nodes, are connected to the core network 23 by core network/radio access interface link(s) 27. The core network/radio access interface link(s) 27 may be, for example, a RAN-CN interface (e.g., N2 interface).

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology. The access node 26 may include, for example, one or more types of relay nodes.

The communication system 20 of FIG. 2 further comprises wireless terminal 30, which also may be referred to as user equipment or UE 30. The wireless terminal 30, for which pertinent aspects are described in further detail below, communicates over a radio or wireless interface 32 with the radio access network 24. Depending on system and circumstances of operation, the wireless terminal 30 may wirelessly communicate with one or more access nodes 26 of one or more radio access networks 24. As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

Communication between radio access network (RAN) 24 and wireless terminal over the radio interface occurs by utilization of "resources". Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element, RE, is the smallest time-frequency unit for downlink transmission in the subframe. That is, one symbol on one sub-carrier in the sub-frame comprises a resource element (RE) which is uniquely defined by an index pair (k, l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix.

In 5G New Radio ("NR"), a frame consists of 10 ms duration. A frame consists of 10 subframes with each having 1 ms duration similar to LTE. Each subframe consists of 29 slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

As mentioned above, the foregoing are only two examples of types of radio frames suitable for the technology disclosed herein. The technology disclosed herein may also be used with other radio frame structures in 5G-Nr or beyond 5G, e.g., in future communication system.

The technology disclosed herein involves and/or concerns coordination between the network and a wireless terminal, UE, that takes into consideration a delay associated with a (re)configuration or activation by the network (CN/OAM, gNB, LMF, or any network entity(s)) of an Artificial Intelligence/Machine Learning (AI/ML) Model or functionality/feature thereof. As such, the technology disclosed herein concerns networks, including network nodes, and wireless terminals that are involved in the determination or anticipation of such delay; the monitoring/notification/communication of the delay to other entities, e.g., to the network or network nodes; and various types of responses to notification/communication of the delay, such as acceptance/acknowledgement of the delay, scheduling the delay, or proposing alternative behavior in lieu of the delayed activity. Various example embodiments are described, including the example embodiment and modes of FIG. 6, FIG. 7, and FIG. 9.

Figure 6:
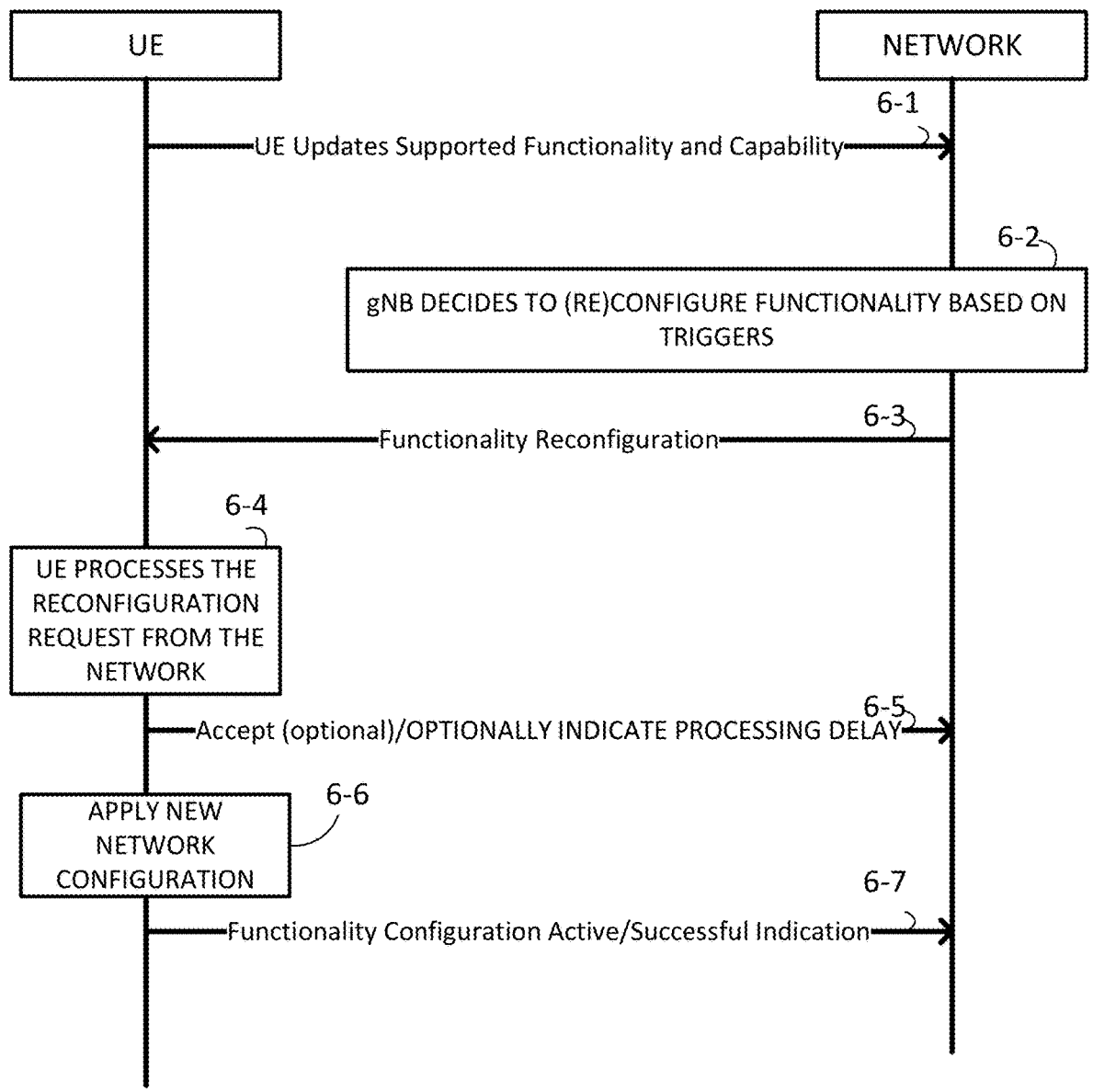
FIG. 6 is a diagrammatic view showing an example method of operation of a communication network and a wireless terminal involving a potential delay in reconfiguration of an already active Artificial Intelligence/Machine Learning (AI/ML) functionality, and particularly shows a situation in which the wireless terminal may switch to a readily available model without model update or model download.

FIG. 6 shows an example method of operation of communication network 22 and wireless terminal 30 involving a potential delay in reconfiguration of an already active Artificial Intelligence/Machine Learning (AI/ML) functionality, and particularly shows a situation in which the wireless terminal may switch to a readily available model without model update or model download.

Figure 7:
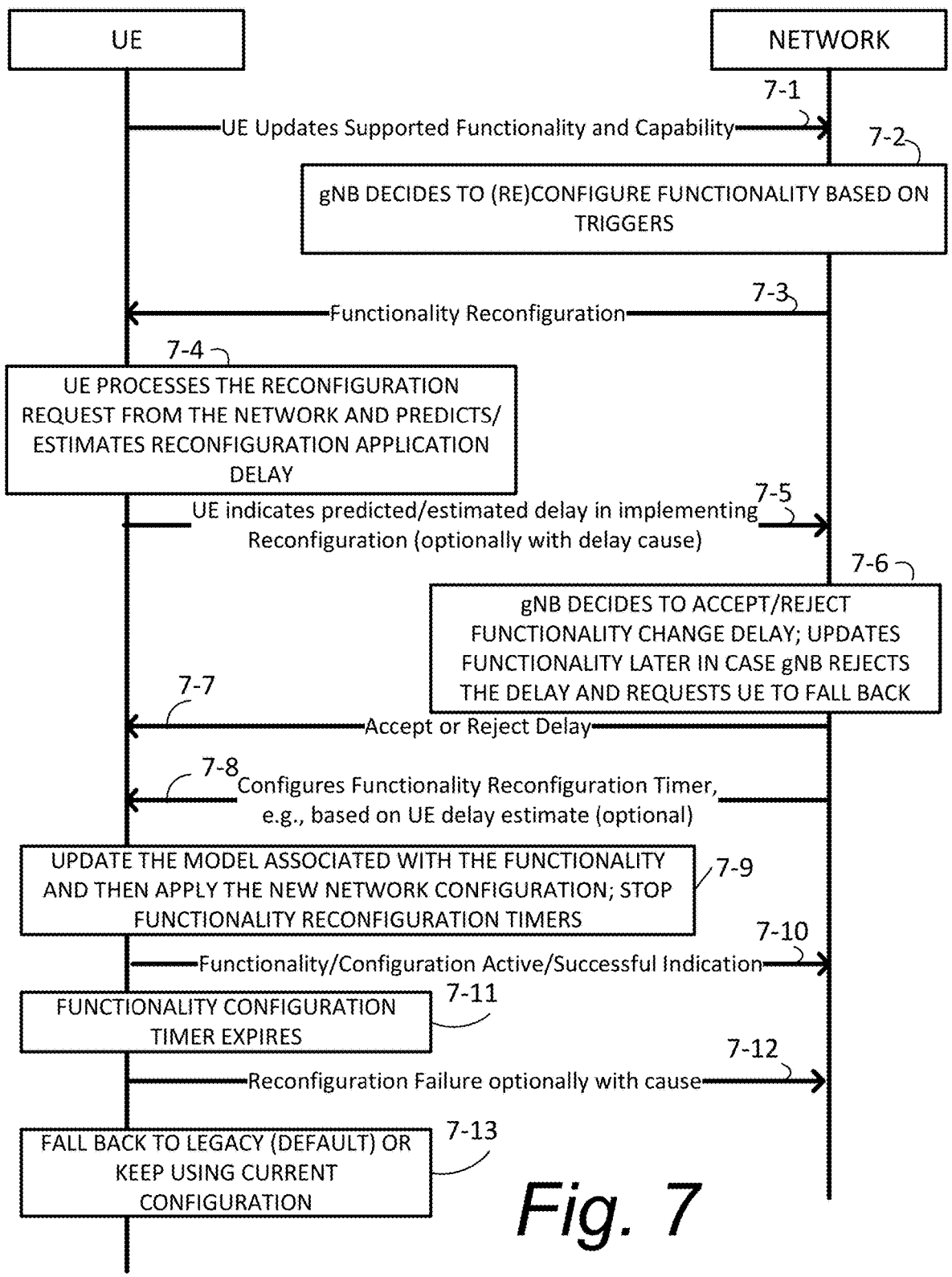
FIG. 7 is a diagrammatic view showing an example method of operation of a communication network and a wireless terminal involving a potential delay in reconfiguration of an already active Artificial Intelligence/Machine Learning (AI/ML) functionality, and particularly shows a situation in which the wireless terminal may be required to switch to a new model within the functionality to support the new configuration or due to change of conditions provided by the network and does so by updating the model before applying the new network configuration.

FIG. 7 shows an example method of operation of communication network 22 and wireless terminal 30 involving a potential delay in reconfiguration of an already active Artificial Intelligence/Machine Learning (AI/ML) functionality, and particularly shows a situation in which the wireless terminal may be required to switch to a new model within the functionality to support the new configuration or due to change of conditions provided by the network and does so by updating the model before applying the new network configuration.

Figure 8:
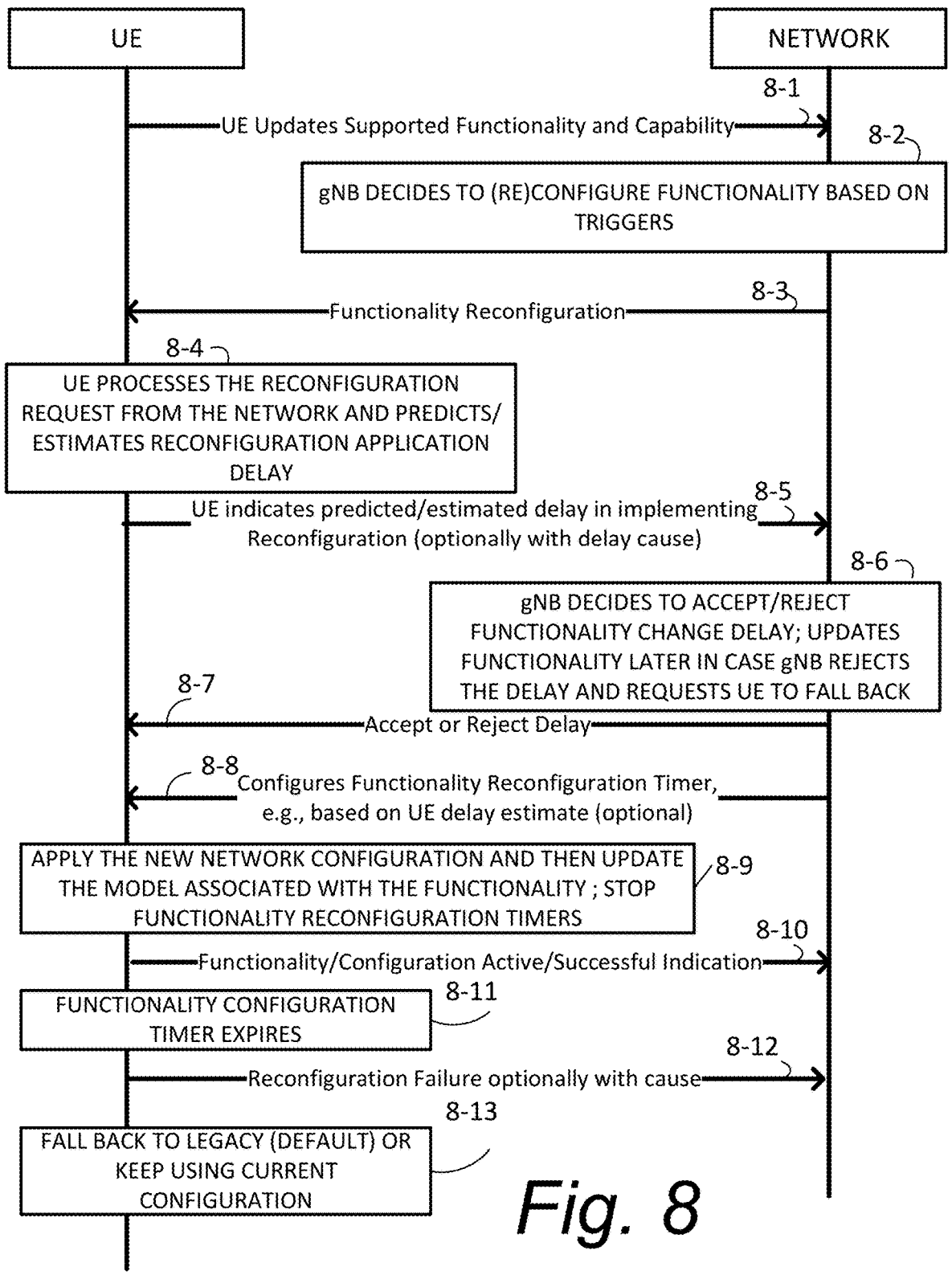
FIG. 8 is a diagrammatic view showing an example method of operation of a communication network and a wireless terminal involving a potential delay in reconfiguration of an already active Artificial Intelligence/Machine Learning (AI/ML) functionality, and particularly shows a situation in which the wireless terminal may be required to switch to a new model within the functionality to support the new configuration or due to change of conditions provided by the network and does so by updating the model after applying the new network configuration.

FIG. 8 shows an example method of operation of communication network 22 and wireless terminal 30 involving a potential delay in reconfiguration of an already active Artificial Intelligence/Machine Learning (AI/ML) functionality, and particularly shows a situation in which the wireless terminal may be required to switch to a new model within the functionality to support the new configuration or due to change of conditions provided by the network and does so by updating the model after applying the new network configuration.

Figure 9:
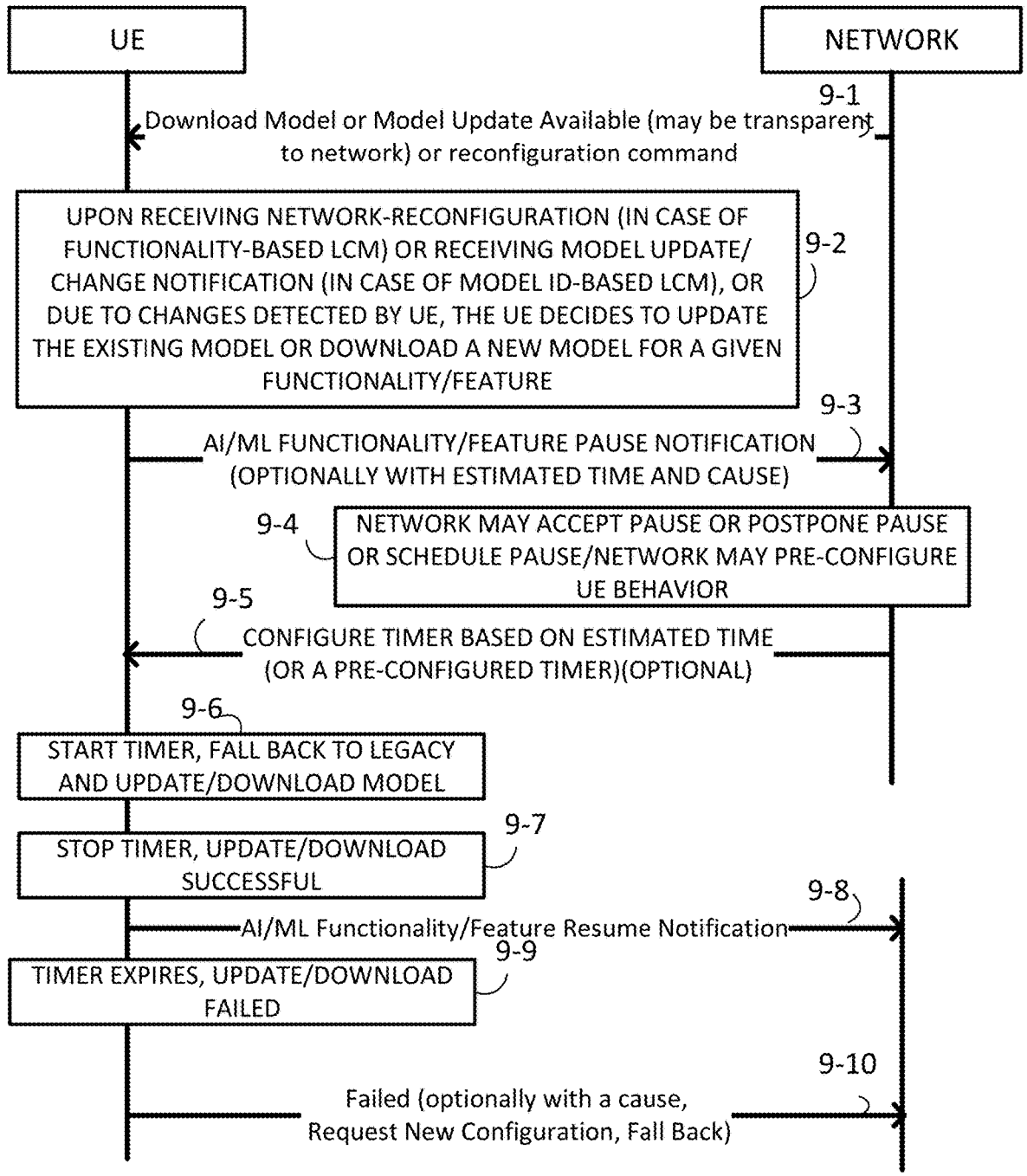
FIG. 9 is a diagrammatic view showing an example method of operation of a communication network and a wireless terminal involving a potential delay in reconfiguration of an already active Artificial Intelligence/Machine Learning (AI/ML) functionality, and particularly shows a situation in which the wireless terminal updates the (active or online) Artificial Intelligence/Machine Learning (AI/ML) model at a later stage after applying the new configuration provided by the network or whenever a model update is available, and further shows that the wireless terminal may have to pause and fallback to a legacy procedure.

FIG. 9 shows an example method of operation of communication network 22 and wireless terminal 30 involving a potential delay in reconfiguration of an already active Artificial Intelligence/Machine Learning (AI/ML) functionality, and particularly shows a situation in which the wireless terminal updates the (active or online) Artificial Intelligence/Machine Learning (AI/ML) model at a later stage after applying the new configuration provided by the network or whenever a model update is available, and further shows that the wireless terminal may have to pause and fallback to a legacy procedure.

Figure 10:
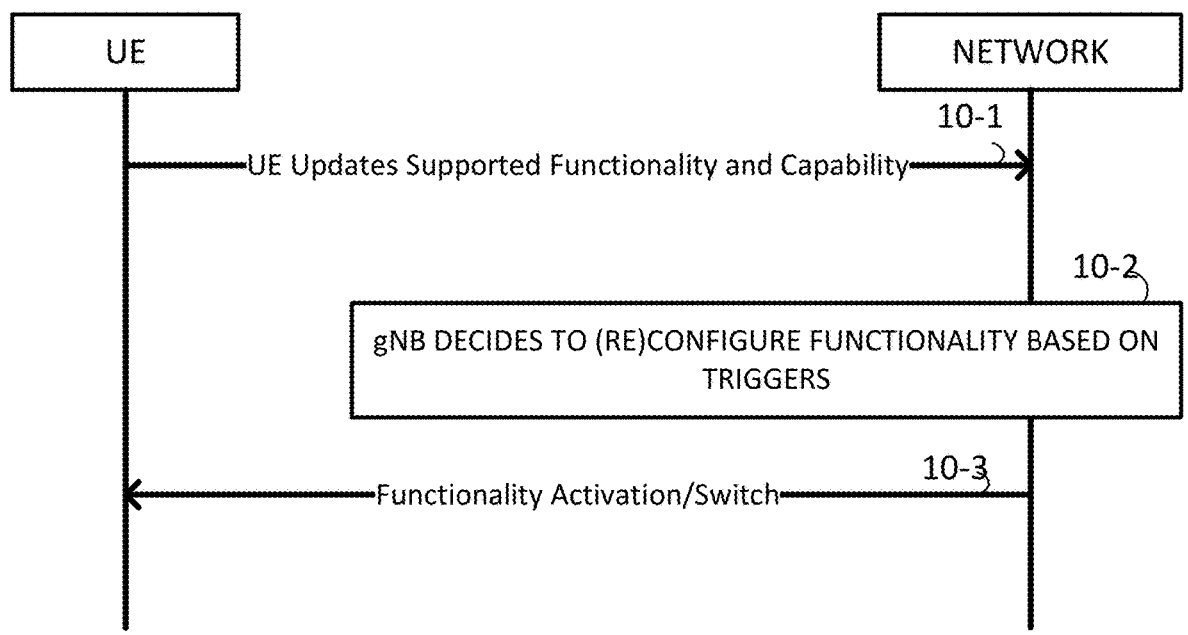
FIG. 10 is a diagrammatic view showing an example method of operation of communication network 22 and wireless terminal 30 involving a potential delay in activating or deactivating an Artificial Intelligence/Machine Learning (AI/ML) functionality and switching to a new Artificial Intelligence/Machine Learning (AI/ML) functionality.

FIG. 10 shows an example method of operation of communication network 22 and wireless terminal 30 involving a potential delay in activating or deactivating an Artificial Intelligence/Machine Learning (AI/ML) functionality and switching to a new Artificial Intelligence/Machine Learning (AI/ML) functionality.

In the example embodiments and modes of FIG. 6-FIG. 10, one or more nodes of the network may interact or communicate with the wireless terminal 30 which has the Artificial Intelligence/Machine Learning Model Capability. Such one or more nodes may be one or more nodes of core network 23, or one or more nodes of radio access network 24, or a combination of nodes comprising core network 23 and radio access network 24. For sake of simplicity, the one or more nodes of the network which communicate with the wireless terminal 30 are generically and/or collectively referred to as network node 34. Thus, it should be understood that network node 34 may, in potentially differing example embodiments and modes, be one or more nodes of core network 23, one or more nodes of radio access network 24, or may be distributed between one or more nodes of core network 23 and radio access network 24.

As mentioned above, FIG. 2 shows an example communication system 20 and in which wireless terminal 30 has artificial intelligence/machine learning model capability. As shown in FIG. 2, the network node 34 comprises network node processor(s) 40. The network node processor(s) 40 may perform many functionalities for its resident node, as understood by those skilled in the art. For performing example functions germane to the example embodiment and mode of FIG. 2, the network node processor(s) 40 may further comprise network artificial intelligence/machine learning capabilities controller 41, e.g., network AI/ML capabilities controller 41. The AI/ML capabilities controller 41 in turn may comprise artificial intelligence/machine learning capabilities models and functions manger 42, e.g., AI/ML capabilities models and functions manger 42; message manager 43; Artificial Intelligence/Machine Learning (AI/ML) message generator 44; and terminals AI/ML configuration manager 46.

The network node 34 may further comprise network node interface circuitry 47. The network node interface circuitry 47 in turn may comprise network node transmitter circuitry 48 and network node receiver circuitry 49.

As described herein, an example non-limiting purpose of network node 34 is to take into consideration a delay associated with a (re)configuration or activation by the network of an Artificial Intelligence/Machine Learning (AI/ML) Model or functionality/feature thereof. In addition to the explanation already provided, the "network" may be the core network including any operation, administration, and management (OAM) functionalities or servers and/or any location management functionalities (LMF) or servers, any access nodes such as gNB, and/or any other network entity(s). As used herein, "Artificial Intelligence/Machine Learning (AI/ML) Model related information" includes, for example, any information that may be used to describe or characterize a model in terms of one or more of identity, features, capability, construction, content, or operation, for example. For example, "Artificial Intelligence/Machine Learning (AI/ML) Model related information" may include AI/ML capability information, model related parameters e.g. size of model (e.g. storage requirement), model complexity, model delivery method, Inference/training complexity and latency, (monitoring, data collection, model delivery) latency, resource usage information, processing delays, UE side hardware/software resources, network resources, collaboration type and level between the UE and the network, positioning information, etc.

FIG. 2 further shows that the wireless terminal 30 may comprise wireless terminal transceiver circuitry 50. The wireless terminal transceiver circuitry 50 may in turn comprise wireless terminal receiver circuitry 52 and wireless terminal transmitter circuitry 54. The transceiver circuitry 50 may include antenna(e) for wireless transmission. The wireless terminal transmitter circuitry 54 may include, e.g., amplifier(s), modulation circuitry and other conventional transmission equipment. The wireless terminal receiver circuitry 52 may comprise, e.g., amplifiers, demodulation circuitry, and other conventional receiver equipment.

FIG. 2 further shows wireless terminal 30 also comprising wireless terminal processor circuitry, e.g., one or more wireless terminal processor(s) 60. The wireless terminal 30, e.g., wireless terminal processor(s) 60, may comprise frame/message generator/handler 62. As is understood by those skilled in the art, in some telecommunications system messages, signals, and/or data are communicated over a radio or air interface using one or more "resources", e.g., "radio resource(s)".

The wireless terminal processor(s) 60 may perform many functionalities for its wireless terminal, as understood by those skilled in the art. For performing example functions germane to the example embodiment and mode of FIG. 2, the wireless terminal processor(s) 60 may further comprise terminal AI/ML capabilities controller 63. The terminal AI/ML capabilities controller 63 may in turn comprise terminal AI/ML capabilities models and functions manager 64; capabilities report message generator 65; configuration message processor 66; configuration controller 67; and delay/pause controller 68.

The wireless terminal 30 may also comprise interfaces 69, including one or more user interfaces. Such user interfaces may serve for both user input and output operations and may comprise (for example) a screen such as a touch screen that can both display information to the user and receive information entered by the user. The user interface 69 may also include other types of devices, such as a speaker, a microphone, or a haptic feedback device, for example.

Figure 4:
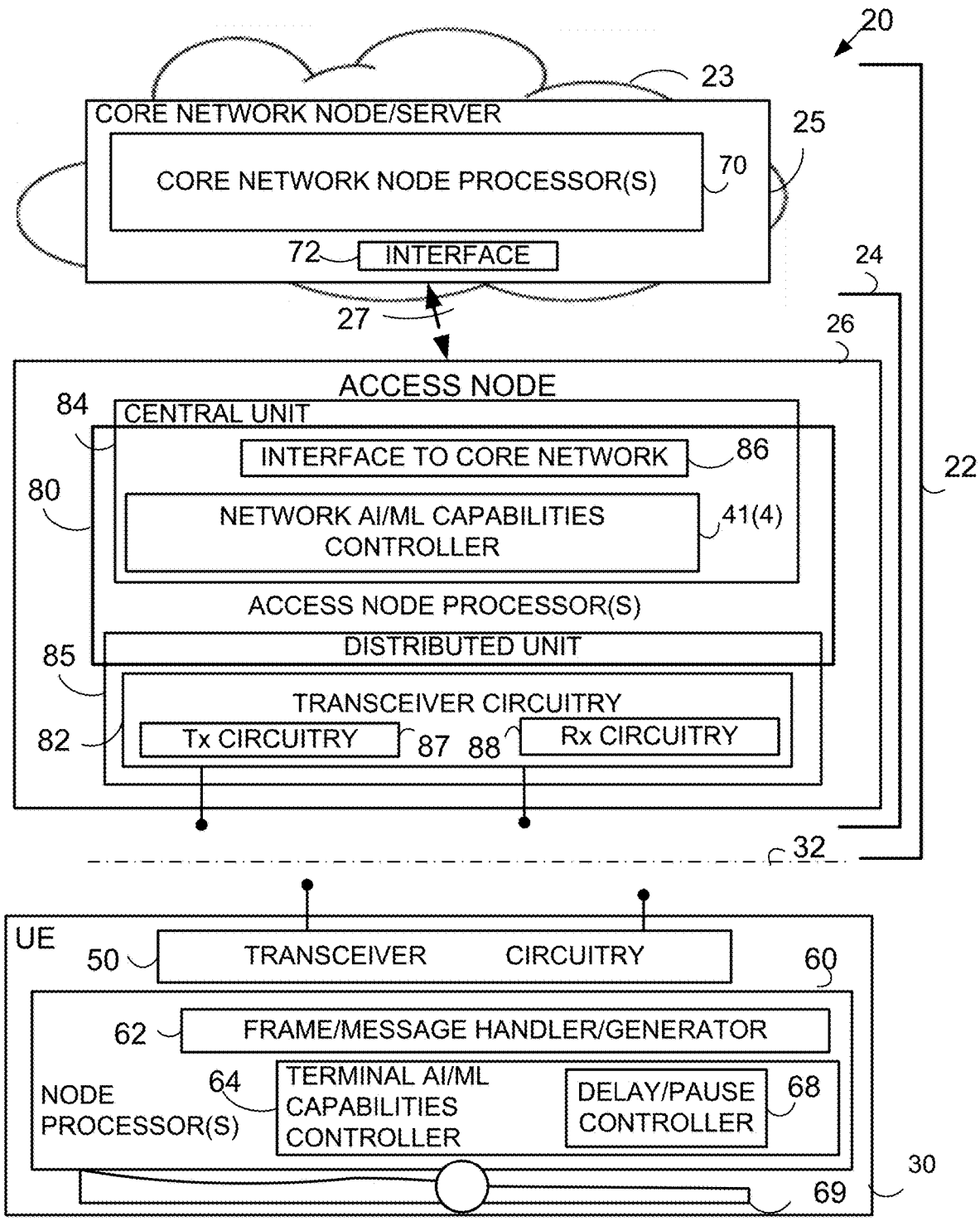
FIG. 4 is a schematic view of an example implementation of the first example embodiment and mode of FIG. 2 in which the network node is a radio access network node.
Figure 5:
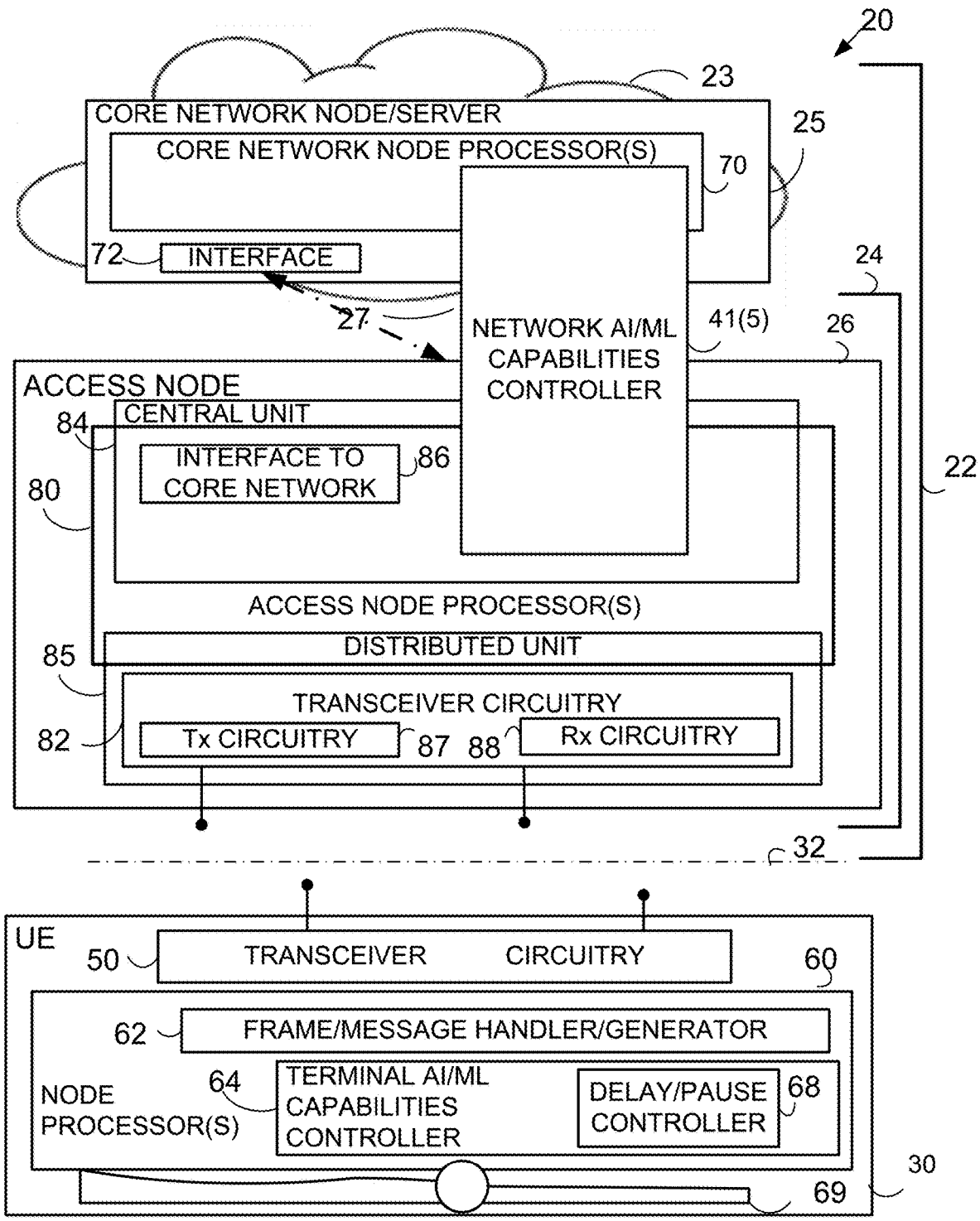
FIG. 5 is a schematic view of an example implementation of the first example embodiment and mode of FIG. 2 in which the network node is distributed between a core network and a radio access network.

It was mentioned above that network node 34 may, in potentially differing example embodiments and modes, be one or more nodes of core network 23, one or more nodes of radio access network 24, or may be distributed between one or more nodes of core network 23 and radio access network 24. FIG. 3-FIG. 5 shows example embodiments and modes of communication network 22 in which core network 23 comprises core network node 25 and in which radio access network 24 comprises access node 26. The core network node 25 in turn comprises core network node processor(s) 70 and core network node interface(s) circuitry 72.

The access node 26 of FIG. 3-FIG. 5 may comprise access node processor(s) 80 and access node transceiver circuitry 82. The access node 26 may comprise distributed architecture and may also comprise access node central unit 84 and access node distributed unit 85. The access node central unit 84 may comprise access node interface circuitry 86 to the core network 23. The access node distributed unit 85 may comprise access node transceiver circuitry 82. The access node transceiver circuitry 82 may include access node transmitter circuitry 87 and access node receiver circuitry 88.

In the example embodiment and mode of FIG. 3 the network node 34 comprises the core network node 25 since the AI/ML capabilities controller 41(3) resides in the core network node 25. By contrast, in the example embodiment and mode of FIG. 4 the network node 34 comprises the access node 26 since the AI/ML capabilities controller 41(4) resides in the access node 26 of FIG. 4. By further contrast, in the example embodiment and mode of FIG. 5 the network node 34 comprises both the core network node 25 and the access node 26 since the AI/ML capabilities controller 41(5) resides at least partially in both the core network node 25 and in the access node 26 of FIG. 5, e.g., is distributed among one or more nodes of the core network 23 and radio access network 24.

In accordance with an example aspect of the technology disclosed herein, the network 20 includes one or more nodes, e.g., one or more nodes such as core network node 25 and access node 26. In an example embodiment and mode such node(s) comprise processor circuitry and interface circuitry. The processor circuitry is configured to generate at least a first message which concerns implementation of an Artificial Intelligence/Machine Learning (AI/ML) Functionality for a wireless terminal served by the network. The processor circuitry which is configured to generate the first message may be, for example, processor circuitry(ies) which hosts the network AI/ML capabilities controller 41, e.g., network AI/ML capabilities controller 41(3), network AI/ML capabilities controller 41(4), or network AI/ML capabilities controller 41(5), and/or terminal AI/ML configuration manager 46. The interface circuitry is configured to transmit the first message over a radio interface and to handle at least a second message which is communicated over the radio interface between the network and the wireless terminal. The second message is configured to indicate at least a potential delay associated with the implementation of the Artificial Intelligence/Machine Learning (AI/ML)

Functionality at the wireless terminal. The second message may be generated and transmitted by wireless terminal 30 and received by the network, or may be generated and transmitted by the network and for reception by wireless terminal 30, e.g., in the case, for example, of the network making its own estimation or determination of a delay, or of the network scheduling a delay proposed by the wireless terminal 30. Depending on whether the architecture of FIG. 3, FIG. 4, or FIG. 5 is implemented, the interface circuitry may comprise one or more of core network node interface(s) circuitry 72 and access node transceiver circuitry 82.

In accordance with an example aspect of the technology disclosed herein, the network 20 also comprises a wireless terminal, such as wireless terminal 30, for example, which communicates over a radio interface with a radio access network. In an example embodiment and mode, the wireless terminal comprises receiver circuitry, such as wireless terminal receiver circuitry 52; processor circuitry such as wireless terminal processor(s) 60; and transmitter circuitry such as wireless terminal transmitter circuitry 54. The receiver circuitry is configured to receive, over the radio interface from the radio access network, at least a first message which concerns implementation of an Artificial Intelligence/Machine Learning (AI/ML) Functionality for the wireless terminal. The processor circuitry is configured to determine, e.g., monitor, at least a potential delay associated with implementation of the Artificial Intelligence/Machine Learning (AI/ML) Functionality at the wireless terminal. In addition, the processor circuitry may be optionally and preferably configured to generate at least a second message configured to notify the radio access network of the at least potential delay. The transmitter circuitry is configured to transmit the second message to the radio access network over the radio interface. The second message may comprise a delay magnitude message and comprise an approximate magnitude of the at least potentially delay. Additionally, or alternatively, the radio access network may make its own assumption of the magnitude of the delay.

FIG. 6 shows an example method of operation of a communication network and a wireless terminal involving a potential delay in reconfiguration of an already active Artificial Intelligence/Machine Learning (AI/ML) functionality. FIG. 6 shows general, non-limiting, example acts including act 6-1 through act 6-7.

Act 6-1 comprises wireless terminal 30 sending an update message to the network, e.g., a message that updates the network regarding the wireless terminal's supported functionality(ies) and capability(ies). One or more examples of such update message may be as explained in U.S. patent application Ser. No. 18/296,799 to SHRIVASTAVA, filed Apr. 6, 2023, entitled "Network Configured Operation of User Equipment With Artificial Intelligence/Machine Learning Model Capability", which is incorporated herein by reference in its entirety. The update message of act 6-1 may include certain information that may trigger the network node to change one or more functionalities of the wireless terminal 30. For example, act 6-2 comprises the network node, e.g., gNB 26, deciding to change functionality based on triggers based on supported functionality by the UE(s).

Act 6-3 comprises the network node, e.g., gNB 26, sending a functionality configuration or reconfiguration message or command to the one or more wireless terminals, such as wireless terminal 30. The functionality configuration or reconfiguration message or command of act 6-3 may also be considered herein as an example of the "first message". This command of act 6-3 may comprise or be included in, for example, a Radio Resource Control, RRC, message. For example, the RRC (re)configuration message (may includes new information elements to direct the (re)configuration. Alternatively, the command or message of act 6-3 may comprise or be a new message, such as a Layer L1 message, a Layer L2 message, or a Layer L3 or a higher layer message.

Act 6-4 comprises wireless terminal 30 receiving the command of act 6-3 and processing the reconfiguration request of the command of act 6-3. During the process(ing) of act 6-4, the wireless terminal 30 may identify specific actions that wireless terminal 30 may need to perform before wireless terminal 30 applies the indicated new configuration by the network in the command of act 6-3. These specific actions may lead to a slight delay in applying the new configuration.

The delay experienced by the wireless terminal 30 in applying the new configuration could be due to various reasons. Example reasons for the anticipated delay may include, but are not limited to, the wireless terminal 30, upon receiving the reconfiguration command, needing to (1) check the model(s) (meta)information, e.g., model version, algorithm type, parameters, inference, associated with the given functionality/feature; (2) check if the model (s) is up to date; and/or (3) check if the UE has computation and related physical and network resources to apply the configuration requested by the gNB etc.

Moreover, as another reason, if the AI/ML model associated to a functionality is not available or is not updated, the wireless terminal 30 may need to first either update or download the appropriate model before wireless terminal 30 can apply the configuration provided by the network. In such case of needing to first update or download the appropriate model, the wireless terminal 30 may perform the actions based on different scenarios, such as scenario A and scenario B described below;

In scenario A, wireless terminal 30 may switch to a readily available model without model update or model download, as shown in FIG. 6. As shown in FIG. 6, the wireless terminal 30 receives the (re) configuration command from the network in act 6-3. Upon receiving reconfiguration command, wireless terminal 30 processes the command as act 6-4. The network, e.g., gNB 26, may implicitly indicate changes to AI/ML model associated with a functionality or a feature via one or more (re) configuration messages. "Implicitly indicate" may mean that some changes or adaptation in configuration parameters related to AI/ML functionality and/or radio/network/UE's internal resources/configuration (e.g., PHY or MAC layer parameters etc.) imply that the UE should adapt the AI/ML model. For example, the changes in CSI reporting configuration parameters, e.g., maximum number of CSI-RS ports, or max. number of CSI processing units, CSI report settings, implicitly indicate that the UE should adapt the AI/ML model to the target condition, scenario or use-cases.

If the processing of act 6-4 is successful, wireless terminal 30 may send an accept message or command to the network, as depicted by act 6-5 of FIG. 6. The accept message of act 6-5 may optionally indicate the fact of a delay associated with executing the new configuration and thus is an example of what may also be referenced herein as the "second message". The accept message of act 6-5 may be generated by delay/pause controller 68 of wireless terminal 30, for example. As a further option, the accept message of act 6-5 may include an anticipated or estimated magnitude of the delay. Alternatively, the accept message of act 6-5 may include information for the network to determine the anticipated or estimated magnitude of the delay. If the accept message of act 6-5 does not include a delay indication from wireless terminal 30, e.g., if no delay information is included, the network may implicitly assume an approximate delay, e.g., the network may make the network's own assumption or estimation of the delay, of which the wireless terminal processing delay may be a component. Alternatively, the network may assume a fixed delay, e.g., 10 ms., 1 second, stored in the memory of the network. Act 6-6 of FIG. 6 shows the wireless terminal 30 applying the requesting reconfiguration. After or as a result of the wireless terminal 30 applying the reconfiguration, as act 6-7 wireless terminal 30 may send a message to the network indicating that the reconfiguration is applied or complete/active or successful. The messages of act 6-5 and/or act 6-7 may be, for example, an RRC message or Medium Access Control, MAC, control element, CE, or a new message or could also be a L1/L2/L3 or higher layer message.

On the other hand, if the processing of act 6-4 is not successful, or the new configuration cannot be applied in act 6-5, wireless terminal 30 instead sends a failure message instead of the success message of act 6-7. The failure message may optionally indicate to the network a cause of the Upon unsuccessful processing of the reconfiguration request at act 6-4 or unsuccessful application of the reconfiguration of act 6-5, the wireless terminal 30 may be (self)configured to perform other actions such as, for example, to keep using an existing configuration(s) or to fallback to the legacy behavior. Other types of similar behavior may also be configured in the event of the failure of act 6-4 and/or act 6-5. In one example, embodiment, the network may also configure wireless terminal 30 to how to behave if there is a failure in applying the configuration. The network may configure the wireless terminal 30 either upon receiving the failure indication, or may have earlier preconfigured the wireless terminal 30 in anticipation of such a failure being possible. The configuration of the wireless terminal 30 by the network upon failure may occur using broadcast/multicast, dedicated signaling, using messages for example, an RRC message or MAC CE or a new message or could also be a L1/L2/L3 or higher layer messages.

It was mentioned above that a failure cause indication may be communicated to the network in case of a failure to implement the requested configuration. The failure cause indication may indicate, for example, one of a first cause, a second cause, a third cause or a fourth cause. The first cause may indicate that the wireless terminal has not completed downloading the model. The second cause may indicate that it is expected to take much time to download the model. The third cause may indicate that the wireless terminal has not have enough power or memory or other hardware capability, or insufficient wireless terminal and/or network resources to operate with the model. The fourth cause may indicate that the model training takes time.

In scenario B, the wireless terminal 30 may be required to switch to a new model within the functionality to support the new configuration or due to change of conditions provided by the network. The new configuration or change of conditions could be, e.g., as per or according to use-case or scenario specific configuration, e.g., for CSI compression use case, it could be CSI-RS measurement conditions, CSI-RS and CSI report configuration conditions, pairing IDs, model IDs, dataset IDs etc. For Beam Manage use case could be, Supported Top-K DL Tx beam prediction, Set A and B conditions, network side performance monitoring conditions etc., for Positioning use case conditions could be, supported N_ports, N_TRP, supported set conditions for measured DL PRS, supported performance monitoring conditions etc.). The switch to a new model within the functionality to support the new configuration can be further done in either of two ways. In a first way, known as Scenario B way (i), the wireless terminal 30 may update the model before applying the new network configuration. In a second way, known as Scenario B way (ii), the wireless terminal 30 may update the model after applying the new network configuration. Both Scenario B way (i) and Scenario B way (ii) are discussed below.

According to Scenario B way (i), the wireless terminal 30 may update the model before applying the new network configuration. The update of Scenario B way (i) may be transparent to the network. In the model update process, the wireless terminal 30 may download a completely new model or may just fetch model related parameters, weights, or functions, e.g., from OAM/CN/Network/RAN or UE side OTT server, gNB, LCM or any other entity inside or outside of the network. As mentioned previously, the term "network" may include one or multiple entities, e.g., radio access network RAN or core network CN or OAM including entities such as base station, LMF or similar entities. The wireless terminal 30 may interact with one or more of such entities depending on the use-case, scenario, and conditions.

FIG. 7 shows example, non-limiting, representative acts or steps of Scenario A, way (i), which involves a potential delay in reconfiguration of an already active Artificial Intelligence/Machine Learning (AI/ML) functionality and a situation in which the wireless terminal may be required to switch to a new model within the functionality to support the new configuration or due to change of conditions provided by the network and does so by updating the model before applying the new network configuration. Act 7-2 and act 7-3 of FIG. 7 are similar to act 6-2 and act 6-3 of FIG. 6. The functionality configuration or reconfiguration message or command of act 7-3 may also be considered herein as an example of the "first message".

Act 7-4 of FIG. 7 comprises wireless terminal 30 processing the reconfiguration request of act 7-3 from the network and predicting or estimating a reconfiguration application delay, a time delay amount required to apply or implement the requested reconfiguration. As act 7-5 of FIG. 7 and the Scenario B way (i), the wireless terminal 30 may send an 'accept reconfiguration' message/command to the network and may indicate an approximate delay in executing/applying the configuration by the network. Thus, the accept reconfiguration message of action 7-5 is an example of what may also be referenced herein as the "second message", and in an example embodiment and mode may be generated by delay/pause controller 68.

As an option, and as described above, the cause of the delay could be indicated to the gNB in the message of act 7-5 or in another message. For example, the cause of the delay may be one wireless terminal of a first cause, a second cause, a third cause or a fourth cause. The first cause may indicate that the wireless terminal has not completed downloading the model yet. The second cause may indicate that it is expected to take much time to download the model. The third cause may indicate that the wireless terminal does not have enough power or memory or other hardware capability to operate with the model. The fourth cause may indicate that the model training takes time.

Act 7-9 comprises wireless terminal 30 updates the model associated with the functionality and then applies the new network configuration. In addition, act 7-9 may comprise wireless terminal 30 stopping any functionality configuration timers, discussed below, that may have been set either by the wireless terminal or by the network. If the update of the model and application of the new network configuration of act 7-9 is successful, as act 7-10 wireless terminal 30 sends a message to indicate success/completion to the network.

As mentioned above, the method of FIG. 7 may involve setting a functionality configuration timer. In this regard, act 7-6 of FIG. 7 comprises the network deciding whether to accept or reject the delay indicated by wireless terminal 30 in the message of act 7-5. In the event that the network as act 7-6 rejects the delay, act 7-6 may further comprise the network setting certain parameters for further operation of wireless terminal 30. For example, the network may set a functionality configuration timer and/or may prescribe actions to be performed by wireless terminal 30 in the event that the wireless terminal 30 fails to implement the requested reconfiguration, e.g., fails to do so before expiration of a functionality configuration timer which is set either by the network or by wireless terminal 30.

In the above regard, if wireless terminal 30 fails to implement the requested reconfiguration, e.g., fails to implement the requested reconfiguration by the expiration of the functionality configuration timer (whose timer value may be set either by the network or by wireless terminal 30), as act 7-12 wireless terminal 30 sends a failure message to the network. The failure message of act 7-12 may optionally indicate a cause for the failure. Thereafter, as act 7-13, the wireless terminal 30 may resort to other behavior which has been prescribed either by the network or preconfigured at wireless terminal 30, such as falling back to a legacy operation or maintaining/keeping a previous configuration for the Artificial Intelligence/Machine Learning (AI/ML) functionality.

According to Scenario B way (ii), the wireless terminal 30 may update the model after applying the new network configuration. That is, according to Scenario B way (ii), the wireless terminal 30 may apply the reconfiguration without the model update, e.g., using the last version of the model without updating. Once the reconfiguration is applied, wireless terminal 30 may update the model at a later stage. The delay associated to model update delay at a later stage may be indicated to the network.

FIG. 8 shows example, representative, example acts or steps of Scenario B way (ii). The acts of FIG. 8 are essentially the same as those of FIG. 7, although having different act prefixes to correspond to the figure number, with the exception of act 8-9. Act 8-9 comprises wireless terminal 30 applying the new network configuration and then updating the model associated with the configuration, i.e., updating the model after applying the new network configuration. The functionality configuration or reconfiguration message or command of act 8-3 may also be considered herein as an example of the "first message". The accept reconfiguration message of action 8-5 is an example of what may also be referenced herein as the "second message".

Various acts of FIG. 8 are also optionally implementable. For example, as act 8-5 the cause of the delay may also be indicated to the gNB/network. As act 8-7 the gNB/network may send an accept indication to wireless terminal 30. Optionally, no response from the gNB/network may implicitly imply that the gNB/network accepts the delay in the application of new configuration by the wireless terminal 30. Act 8-6 may comprise the gNB/network declining the delay and providing a new configuration or indicate fallback to legacy procedure or schedule the new configuration or model update or model download or related configuration to be applied after a certain time. Upon receiving the delay indication with estimated delay duration from the wireless terminal, as act 8-6 and communicated in the message of act 8-8 the network may (pre)configure a timer based on, for e.g., wireless terminal (re)configuration application delay. The configured timer may be helpful for the network to track UE progress and in case UE undergoes Radio Link Failure (RLF) or Hand Over Failure (HoF) or any other failure and determine if the reconfiguration is successful or not. If the reconfiguration is successful, the wireless terminal may stop the timer in conjunction with act 8-9 and send a reconfiguration successful notification as act 8-10 to the network. If the timer expires, then the reconfiguration may be considered to have failed at act 8-11, in which case the wireless terminal may send a failure notification as act 8-12 to the network. Thereafter, the wireless terminal 30 may perform different operation, such as, for example, switch to legacy methods or keep using the old configuration. As indicated above, the UE behavior after failure maybe (pre) configured by the network.

The following comments are applicable both to the method of FIG. 7 and the method of FIG. 8:

- In both FIG. 7 and FIG. 8, the acts suffixed as act-11, -12 and -13 are conditional such that they are executed when act-10 fails, or the reconfiguration timer expires or the application of the new configuration fails, etc.
- The wireless terminal 30 may send a model update in process indication to the network and model update complete or failed command once the update is complete. In case of failed model update cause for failure may be optionally indicated.
- The reconfiguration successful/failed, model update in process or completed or failed are separate messages but maybe combined. Model related messages maybe used for e.g., in Model ID based Life Cycle Management (LCM), reconfiguration related messages maybe used for e.g., in Functionality based LCM or Model ID based LCM etc.
- The above procedures may be performed using for e.g., dedicated signaling e.g., an RRC message or MAC CE or a new message could also be a L1/L2/L3 or higher layer message or broadcast/multi-cast signaling.
- The acts described in FIG. 7 and FIG. 8 and any other figure may be performed in different orders or in different combinations.
- The AI/ML model may be within the 3GPP network or outside of the network.

Another aspect of the technology disclosed herein relates to example optional considerations for the method of FIG. 8, e.g., Scenario B way (ii), in which the wireless terminal 30 updates an Artificial Intelligence/Machine Learning (AI/ML) model at a later stage after applying the new configuration provided by the network or whenever a model update is available. In accordance with this further aspect of the FIG. 8 method, the wireless terminal 30 may consider the various options associated with Model management. The model may be either active or online or offline.

FIG. 9 shows example, representative, basic acts or steps of an example method of operation of a communication network and a wireless terminal involving a potential delay in reconfiguration of an already active Artificial Intelligence/Machine Learning (AI/ML) functionality, and particularly shows a situation in which the wireless terminal updates the (active or online) Artificial Intelligence/Machine Learning (AI/ML) model at a later stage after applying the new configuration provided by the network or whenever a model update is available, and further shows that the wireless terminal may have to pause and fallback to a legacy procedure.

Various ones of the acts of FIG. 9 may be performed by a wireless terminal, such as wireless terminal 30 of FIG. 2-FIG. 5, while other acts of FIG. 9 may be performed by a network node of FIG. 2-FIG. 5.

A wireless terminal which performs the acts of FIG. 9 communicates over a radio interface with a radio access network and, in an example embodiment and mode, comprises receiver circuitry, processor circuitry, and transmitter circuitry. The receiver circuitry, which may be illustrated by and described with reference to wireless terminal receiver circuitry 52 of FIG. 2, is configured to receive, over the radio interface from the radio access network, at least a first message which concerns implementation of an Artificial Intelligence/Machine Learning (AI/ML) Functionality/feature for the wireless terminal. An example of the first message for the method of FIG. 9 is described with reference to act 9-1 of FIG. 9. The processor circuitry, which may be illustrated by and described with reference to wireless terminal processor(s) 60 of FIG. 2, is configured to make a determination that the reception of the first message requires one of the following: (1) an update of an existing model for the Artificial Intelligence/Machine Learning (AI/ML) Functionality/feature; and (2) a download of a new model for the Artificial Intelligence/Machine Learning (AI/ML) Functionality/feature for a particular functionality or feature. The processor circuitry may also optionally and preferably be configured to generate a pause notification message configured to notify the radio access network to pause implementation of the Artificial Intelligence/Machine Learning (AI/ML) Functionality/feature. The pause notification message may be generated by delay/pause controller 68 of wireless terminal 30, for example. An example of the pause notification for the method of FIG. 9 is described with reference to act 9-3 of FIG. 9. The transmitter circuitry, which may be illustrated by and described with reference to wireless terminal transmitter circuitry 54 of FIG. 2, is configured to transmit the pause notification message to the radio access network over the radio interface.

In an example embodiment and mode, a network node which performs the acts of FIG. 9 comprises processor circuitry and interface circuitry. The processor circuitry is configured to generate at least a first message which requires one of the following: an update of an existing model for the Artificial Intelligence/Machine Learning (AI/ML) Functionality/feature; and a download of a new model for the Artificial Intelligence/Machine Learning (AI/ML) Functionality/feature for a particular functionality or feature. An example of the first message for the method of FIG. 9 is described with reference to act 9-1 of FIG. 9. The processor circuitry which is configured to generate the first message may be, for example, processor circuitry(ies) which hosts the network AI/ML capabilities controller 41, e.g., network AI/ML capabilities controller 41(3), network AI/ML capabilities controller 41(4), or network AI/ML capabilities controller 41(5), and/or terminal AI/ML configuration manager 46. The interface circuitry is configured to transmit the first message to a wireless terminal over a radio interface and to receive from the wireless terminal over the radio interface a pause notification message configured to notify the network to pause implementation of the update of the existing model or the download of the new model. An example of the pause notification for the method of FIG. 9 is described with reference to act 9-3 of FIG. 9. Depending on whether the architecture of FIG. 3, FIG. 4, or FIG. 5 is implemented, the interface circuitry may comprise one or more of core network node interface(s) circuitry 72 and access node transceiver circuitry 82.

In the case of FIG. 9, the wireless terminal 30 may also request the network to pause functionality to provide an update or send an update available notification either to the network or to the UE. The wireless terminal 30 may request the network to pause functionality to provide an update in a situation such as, for example, the wireless terminal 30 is inside the network, considering both Model ID and Functionality based LCM including one-side and two-side models. The functionality or component of wireless terminal 30 that may request the pause may comprise one or more Model Storage and Training entities, which may comprise or be realized by wireless terminal processor(s) 60, and in some example embodiment and modes may comprise or be realized by terminal AI/ML capabilities models and functions manager 64 and/or configuration controller 67.

FIG. 9 shows a generic framework for pausing a functionality/feature to download and apply updates or a new configuration. The method of FIG. 9 may be applied to/utilized in both Model ID and Functionality based AI/ML LCM procedures, respectively.

Act 9-1 of FIG. 9 comprises the network sending a Download Model or Model Update Available or reconfiguration message/command to wireless terminal 30. Thus, the message of act 9-1, which is an example of a "first message", may request, for example, network reconfiguration, e.g., in the case of a functionality-based Life Cycle Management (LCM), or a model update or model change notification in the case of a model-ID based Life Cycle Management (LCM), or a change detected by the wireless terminal, e.g., a change in wireless terminal conditions such as, for example, resources, scenario, e.g., urban, rural, macro etc., hardware/network resource availability, changes in network configuration by the network, etc. Act 9-2 comprises wireless terminal 30, upon receiving the message of act 9-1, deciding to update an existing model or to download a new model for a given functionality of feature. Act 9-3 comprises the wireless terminal 30, e.g., delay/pause controller 68, generating and sending a pause notification message to the network. The pause notification message may optionally include an estimated pause time magnitude and a cause or reason for the pause request. Act 9-4 comprise the network either accepting the pause of the pause notification message, or performing a counter-operation such as postponement of the pause, scheduling the pause at a time determined by the network, or prescribing/(pre)configuring behavior for the wireless terminal 30, e.g., in case of a reconfiguration/update/download failure.

As mentioned above, act 9-4 of FIG. 9 comprises the network deciding whether to accept or reject the pause indicated by wireless terminal 30 in the pause notification message of act 9-4. In the event that the network as act 9-4 rejects the pause, as explained above act 9-4 may further comprise the network setting certain parameters for further operation of wireless terminal 30. For example, the network may set a functionality configuration timer and/or may prescribe actions to be performed by wireless terminal 30 in the event that the wireless terminal 30 fails to implement the requested reconfiguration, e.g., fails to do so before expiration of a functionality configuration timer which is set either by the network or by wireless terminal 30.

Act 9-6 comprises the wireless terminal 30 starting any reconfiguration timer for which either wireless terminal 30 or the network has set a timer value. In addition, act 9-6 comprise the wireless terminal 30 falling back to a legacy operation, and then performing the update or download of the Artificial Intelligence/Machine Learning (AI/ML) model which was requested by the message of act 9-1. Act 9-7 comprises wireless terminal 30 determining whether the update or download of act 9-6 was successful. In the event that the update or download was successful, act 9-7 further comprises wireless terminal 30 sending a notification to the network, shown in FIG. 9 as an AI/ML Functionality/Feature Resume Notification.

On the other hand, if it is determined as act 9-9 that wireless terminal 30 fails to implement the requested update or download at act 9-6, e.g., fails to implement the requested update or download by the expiration of the functionality configuration timer (whose timer value may be set either by the network or by wireless terminal 30), as act 9-10 wireless terminal 30 sends a failure message to the network. The failure message of act 9-10 may optionally indicate a cause for the failure. Thereafter, the wireless terminal 30 may resort to other behavior which has been prescribed either by the network or preconfigured at wireless terminal 30, such as falling back to a legacy operation or maintaining/keeping a previous configuration for the Artificial Intelligence/Machine Learning (AI/ML) functionality.

The operation of the example method of FIG. 9 may be applicable to one or more of the following scenarios.

An AI/ML enabled feature/functionality/use case maybe using one AI/ML model and the model in use i.e., an active or online model is required to be updated or a new model is to be downloaded.

An AI/ML enabled feature/functionality/use case may support one or more models. In this case, one or more inactive or offline models (not currently active/deployed) may need to be updated or downloaded.

In a UE or a network entity, One or multiple models may be updated in parallel associated to one or more functionalities/features or use-cases. The network may indicate to the wireless terminal to update or download both one or multiple active (online) or inactive models (offline model updates/download) associated with a feature/functionality/use case.

The wireless terminal may optionally indicate to the network if offline or inactive model(s) associated to a feature/functionality/use case are updated or downloaded for e.g., in UAI, RRC message or L1/L2/L3 message or a new message or a higher layer message.

An AI/ML enabled feature/functionality/use case upon receiving a model (de) activation or switch command may trigger model update/download procedure.

If within an AI/ML enabled feature/functionality, the wireless terminal intends to update, download, or switch, etc., an active model or related configuration or function, it may do so by sending a pause notification request to the network as shown in act 9-3.

Upon receiving pause or model switch or activation notification, the network may perform one or more of the following actions:

Accept and wait until the resume or success notification is received in act 9-8.

Accept and (pre) configure a timer based on for e.g., estimated UE pause time as shown in act 9-5.

Schedule update to another time, optionally with a timer.

(Pre) configure the behavior of the wireless terminal in case the update/download or new configuration fails.

In act 9-6, the wireless terminal 30 may switch to legacy behavior, may start the timer (if configured), and may start updating or downloading the model.

If the AI/ML model update or download is successful, the UE stops the timer (if configured), and sends the success and resume notification to the network, as shown in act 9-8.

If the AI/ML model update or download fails or the timer of wireless terminal 30 expires (if configured), the wireless terminal 30 sends a failure notification to the network as act 9-10. This notification may optionally be sent with indicating failure cause, with request for a new configuration to the network or wireless terminal self-selected behavior e.g., fallback to legacy or wireless terminal can behave as pre-configured by the network (e.g., fallback to legacy, use older version of the model(s), use a pre-configured default model or stop functionality/feature etc.). If no notification is received within the timer duration, the network may implicitly assume a failure.

In one option, the wireless terminal may have to parallelly update the model while using the existing configuration and related parameters and functions. Such parallel update may be resource intensive.

In another option, the wireless terminal may have to stop the existing functionality (without falling back) and then update, which may cause service interruptions.

In another option, the wireless terminal may switch to a different model, e.g., a pre-configured default model or an older version of the model, within a feature or functionality, update or download the active model and then switch back to the model that was initially active.

In another option, the network, which may be or comprise any of OAM/CN/RAN or UE side OTT server, gNB, LCM, or any other entity inside or outside of the network, or the model storage and training entity(s) may request the wireless terminal to delete older versions/copies of the model. The wireless terminal may itself delete older versions of the model(s) including related information/meta data and report it to the network and/or model storage and training entity(s). Additionally, the model storage and training entity(s) may request the network to delete older versions of the model(s) including related information/meta data.

The wireless terminal may optionally also indicate which AI/ML model update/download method it is using to the network.

In another option the wireless terminal may use a pause functionality procedure with or without network configured timer similar to FIG. 9 in other situations, such as where the wireless terminal desires to, e.g., pause one functionality (due, for example, to resource usage limitations) e.g., pause CSI estimation (any initial functionality/feature), then activate a different functionality e.g., activate BM, and when the wireless terminal can support both then resume CSI estimation or initial functionality. During the pause, the wireless terminal may use the initial functionality either via fallback mechanisms (without AI/ML features) or not use it. Optionally, the network may prioritize or indicate preference for functionality pausing to the wireless terminal.

These behaviors may be (pre)configured by the network using dedicated signaling e.g., an RRC message, e.g., via introducing new information elements in an RRC message, or MAC CE or a new message could also be a L1/L2/L3 or higher layer message or broadcast/multi-cast signaling.

It is again noted that the acts described in any of the figures herein may be performed in different orders or in different combinations. The AI/ML model may be within the 3GPP network or outside of the network.

In a case that the wireless terminal does not have the appropriate model to execute the reconfiguration indicated by the network for a given feature/functionality, the wireless terminal may need to download a new model first.

The delay associated with executing the new configuration+model download (first download then apply new configuration) may be indicated+estimated Download time (optionally) to the network. This option is similar to the FIG. 7.

In one option, if the wireless terminal or the network intends to switch an active model it may do so by either first de-activating the active model and then activating the new model, or first, a new model is activated and then the existing model is de-activated or use pause indication as described above. In all cases, the associated delay and cause may optionally be indicated to the network. In case of failure, the cause of the failure maybe indicated, a new request for reconfiguration to the network maybe triggered or the wireless terminal maybe preconfigured by the network for falling back to legacy mechanisms or to a different model for e.g., a default model.

The methods of FIG. 6, FIG. 7, FIG. 8, and FIG. 9 essentially pertain to a "first case" involving or concerning (re)configuration of an Artificial Intelligence/Machine Learning (AI/ML) Functionality for the wireless terminal, wherein the first message essentially concerns/commands (re)configuration of an Artificial Intelligence/Machine Learning (AI/ML) Functionality for the wireless terminal. The method of FIG. 10, on the other hand, pertain to a "second case" involving a potential delay in activating or deactivating an Artificial Intelligence/Machine Learning (AI/ML) functionality and switching to a new Artificial Intelligence/Machine Learning (AI/ML) functionality.

Thus, the second case, e.g., CASE-2, concerns (De) Activating an existing functionality and then switching to a new functionality. The second case does not necessarily mean de-activating any existing functionality.

Act 10-1 comprises wireless terminal 30 sending to the network a message which informs the network of the updates supported functionality and capabilities of the wireless terminal 30. Act 10-2 comprises the network, e.g., access node 26, deciding to (re)configure a functionality based on triggers discerned from the message of act 10-1. Here configuring means setting or selecting the parameters (e.g., PHY or MAC or higher layer parameters) before a feature or functionality is activated. Act 10-3 comprises the network sending a functionality activation message or command to the wireless terminal 30, instead of re-configuration message or command.

Upon receiving the message or command of act 10-3, the wireless terminal 30 may perform the following actions like the description of the first case, e.g., FIG. 6, FIG. 7, FIG. 8, or FIG. 9 above:
 The wireless terminal may use an already existing model without updates, which involves only the delay associated with activating a new functionality. This act/situation is similar to the method of FIG. 6.
 The wireless terminal may activate the functionality, update the model before switching or update it after activating the new functionality, the delay associated to activating the functionality+model update delay being indicated. The wireless terminal may send a model update in process indication to the network and model update complete once the update is complete, e.g., in Model ID based LCM) or failed command if model update/reconfiguration is successful. In case of failed model update cause for failure may be optionally indicated. This case is similar to the methods of FIG. 7 and FIG. 8. For example, the wireless terminal may deactivate the functionality when the wireless terminal received Functionality reconfiguration in act 7-2 of FIG. 7.
 The wireless terminal may need to download a new model first before activating a new feature/functionality (the delay associated to activating the new functionality+model download (first download then activate) is indicated to the network). In this case also, the wireless terminal may send a model update in process indication to the network and model update complete or failed command once the update is complete. In case of failed model update cause for failure may be optionally indicated. This case is similar to the method of FIG. 7. For example, the wireless terminal may deactivate the functionality when the wireless terminal sent the functionality configuration successful indication in act 7-12 of FIG. 7. The wireless terminal may need to download a new model first before activating a new feature/functionality (the delay associated to activating the new functionality+model download (first download then activate) is indicated to the network). In this case also, the UE may send a model update in process indication to the network and model update complete or failed command once the update is complete. In case of failed model update cause for failure may be optionally indicated. This case is similar to an aspect of case one described above. For example, the UE may deactivate the functionality when the UE sent the functionality configuration successful indication in act 6-9. A "deactivate" may refer to the initial (in use) or old functionality when a new functionality is activated, and in essence refers to switching, e.g., switching where one functionality is activated and other is deactivated or vice-versa.

"Functionality/Feature Switching" refers to a case in which the wireless terminal has, for example, one or more functionality(s) active like CSI compression, and in which the network switches to another functionality for, e.g., beam management or positioning estimation. In this case, the wireless terminal may behave as follows:
 The wireless terminal may activate the new functionality/feature as per the network command and then wait until the activation is successful. Once the activation of the new functionality/feature is successful, the wireless terminal 30 deactivates the existing functionality. If the activation fails, then the wireless terminal 30 may be (pre) configured by the network to:
 First send a failure notification optionally with a cause and then:
  Not deactivate (i.e., keep using) the existing functionality, but fallback to legacy mechanisms for the new functionality/feature or do not fallback.
  de-activate the existing functionality but fallback to legacy mechanisms for the new functionality/feature or
  de-activate the existing functionality but do not fallback.
 The wireless terminal may first de-activate the existing functionality/feature and then activate the new functionality/feature as indicated by the network. If the activation fails, then the wireless terminal may be (pre) configured by the network to first send a failure notification optionally with a cause and then:
  Fallback to legacy mechanisms for the new functionality/feature or
  Do not fallback to legacy mechanism and request network for a re-configuration.

In another option the wireless terminal may use a pause functionality indication with or without network configured timer using a procedure similar to the procedure explained in FIG. 9 where the wireless terminal, for example, pauses one functionality e.g., CSI estimation, then activates a different functionality, e.g., activates a beam management, BM, functionality, and if the new functionality is successful, then disables the initial/existing functionality. The use of a timer may be optional. In case of failure the wireless terminal may behave as explained above.

Upon receiving the functionality reconfiguration or activation or switch message, the wireless terminal may indicate preference on AI/ML model parameters or wireless terminal configuration associated to a given functionality or feature for a target use-case/scenario. The wireless terminal may initiate the procedure in several cases, if it was configured to do so, including upon having a preference on AI/IL model parameters and upon change of its preference on AI/MBL model parameters (this could be for optimizations at the wireless terminal or after UE optimization). This could be done for e.g., using UAI message or any other L1/L2/L3 or a higher layer or a new message.

If a wireless terminal is requested by the network to parallelly activate a new functionality and the wireless terminal could not support multiple parallel functionalities/features simultaneously at a given/same time due to for e.g., limited hardware/network/software resources or overheating etc., it may indicate it to the network for e.g., as a request to deactivate another functionality, temporarily unavailability or request for a switch command instead of activation command etc., this maybe indicated optionally with or without cause.

The technology disclosed herein encompasses but is not limited to the following example embodiments:

Example Embodiment 1: A network including one or more nodes which comprises:

processor circuitry configured to generate at least a first message which concerns implementation of an Artificial Intelligence/Machine Learning (AI/ML) Functionality for a wireless terminal served by the network;

interface circuitry configured to transmit the first message over a radio interface and to handle at least a second message which is communicated over the radio interface between the network and the wireless terminal, the second message being configured to indicate at least a potential delay associated with the implementation of the Artificial Intelligence/Machine Learning (AI/ML) Functionality at the wireless terminal.

Example Embodiment 2: The network of Example Embodiment 1, wherein the processor circuitry assumes the potential delay and includes generates a timer value indicative of the assumed potential delay.

Example Embodiment 3: A method in a wireless terminal which communicates over a radio interface with a radio access network, the method comprising:

receiving, over the radio interface from the radio access network, at least a first message which concerns implementation of an Artificial Intelligence/Machine Learning (AI/ML) Functionality for the wireless terminal;

determining at least a potential delay associated with implementation of the Artificial Intelligence/Machine Learning (AI/ML) Functionality at the wireless terminal; and optionally generating at least a second message configured to notify the radio access network of the at least potential delay;

optionally transmitting the second message to the radio access network over the radio interface.

Example Embodiment 4: A wireless terminal which communicates over a radio interface with a radio access network, the wireless terminal comprising:

receiver circuitry configured to receive, over the radio interface from the radio access network, at least a first message which concerns implementation of an Artificial Intelligence/Machine Learning (AI/ML) Functionality for the wireless terminal;

processor circuitry configured to determine at least a potential delay associated with implementation of the Artificial Intelligence/Machine Learning (AI/ML) Functionality at the wireless terminal.

Example Embodiment 5: The wireless terminal of Example Embodiment 4, wherein the processor circuitry is further configured to generate at least a second message configured to notify the radio access network of the at least potential delay, and wherein the wireless terminal further comprises transmitter circuitry configured to transmit the second message to the radio access network over the radio interface.

Example Embodiment 6: The wireless terminal of Example Embodiment 5, wherein the processor circuitry is configured to determine at least an approximate magnitude of the at least potential delay and to include the approximate magnitude in a delay magnitude message, and wherein the transmitter circuitry is configured to transmit the delay magnitude message to the radio access network.

Example Embodiment 7: The wireless terminal of Example Embodiment 5 wherein the processor circuitry is configured to generate a delay cause message which comprises an indication of a cause of the at least potential delay, and wherein the transmitter circuitry is configured to transmit the delay cause message to the radio access network. The at least a second message may comprise the delay cause message and comprise the indication of the cause of the at least potentially delay.

Example Embodiment 8: The wireless terminal of Example Embodiment 4, wherein the at least first message concerns/commands (re)configuration of an Artificial Intelligence/Machine Learning (AI/ML) Functionality for the wireless terminal.

Example Embodiment 9: The wireless terminal of Example Embodiment 4, wherein upon receipt of the at least first message the processor circuitry is configured to switch to a readily available model for the Artificial Intelligence/Machine Learning (AI/ML) Functionality without update of the model or download of the model.

Example Embodiment 10: The wireless terminal of Example Embodiment 4, wherein upon receipt of the at least first message the processor circuitry is configured to apply a reconfiguration for the Artificial Intelligence/Machine Learning (AI/ML) Functionality to a last version of a model for the Artificial Intelligence/Machine Learning (AI/ML) Functionality and thereafter to update the model for the Artificial Intelligence/Machine Learning (AI/ML) Functionality.

Example Embodiment 11: The wireless terminal of Example Embodiment 5, wherein the second message is configured to notify the radio access network of the at least potential delay associated with the model update.

Example Embodiment 12: The wireless terminal of Example Embodiment 4, wherein upon receipt of the at least first message the processor circuitry is configured to update a model for the Artificial Intelligence/Machine Learning (AI/ML) Functionality and thereafter to apply a reconfiguration of the at least first message to the updated model.

Example Embodiment 13: The wireless terminal of Example Embodiment 12, wherein the processor circuitry is configured to update the mode by performing one of the following: (1) downloading a completely new model; and (2) fetching model related parameters, weights, or functions.

Example Embodiment 14: The wireless terminal of Example Embodiment 12, wherein the processor circuitry is configured to generate an accept reconfiguration message which notifies the radio access network that a command of the at least first message has been accepted and which comprises an approximate delay in executing the reconfiguration.

Example Embodiment 15: The wireless terminal of Example Embodiment 8, wherein the processor circuitry is configured to set a timer according to the timer value and to determine whether the (re)configuration of the Artificial Intelligence/Machine Learning (AI/ML) Functionality for the wireless terminal is completed before expiration of the timer.

Example Embodiment 16: The wireless terminal of Example Embodiment 15, wherein when the processor circuitry determines that the (re)configuration of the Artificial Intelligence/Machine Learning (AI/ML) Functionality for the wireless terminal is not completed before expiration of the timer, the processor circuitry performs one of the following:

maintains an existing configuration for the Artificial Intelligence/Machine Learning (AI/ML) Functionality;

falls back to legacy operation;

receives from the radio access network another (re)configuration of the Artificial Intelligence/Machine Learning (AI/ML) Functionality and implements the another (re)configuration of the Artificial Intelligence/Machine Learning (AI/ML) Functionality.

Example Embodiment 17: The wireless terminal of Example Embodiment 15, wherein the receiver circuitry is further configured to receive, over the radio interface from the radio access network, at timer message comprising the timer value, and wherein the processor circuitry is configured to set the timer according to the timer value and to determine whether the (re)configuration of the Artificial Intelligence/Machine Learning (AI/ML) Functionality for the wireless terminal is completed before expiration of the timer.

Example Embodiment 18: The wireless terminal of Example Embodiment 4, wherein the at least first message concerns/commands activation of a new Artificial Intelligence/Machine Learning (AI/ML) Functionality for the wireless terminal.

Example Embodiment 19: The wireless terminal of Example Embodiment 18, wherein upon receipt of the at least first message the processor circuitry is configured to deactivate an existing Artificial Intelligence/Machine Learning (AI/ML) Functionality for the wireless terminal and to switch to the new Artificial Intelligence/Machine Learning (AI/ML) Functionality for the wireless terminal.

Example Embodiment 20: A wireless terminal which communicates over a radio interface with a radio access network, the wireless terminal comprising:

receiver circuitry configured to receive, over the radio interface from the radio access network, at least a first message which concerns implementation of an Artificial Intelligence/Machine Learning (AI/ML) Functionality/feature for the wireless terminal;

processor circuitry configured:

(a) to make a determination that the reception of the first message requires one of the following:

(1) an update of an existing model for the Artificial Intelligence/Machine Learning (AI/ML) Functionality/feature;

(2) a download of a new model for the Artificial Intelligence/Machine Learning (AI/ML) Functionality/feature for a particular functionality or feature;

to make a determination that a pause maybe necessary to implement the Artificial Intelligence/Machine Learning (AI/ML) Functionality/feature.

Example Embodiment 21: The wireless terminal of Example Embodiment 20, wherein the processor circuitry is further configured to generate a pause notification message configured to notify the radio access network to pause implementation of the Artificial Intelligence/Machine Learning (AI/ML) Functionality/feature; and wherein the wireless terminal comprises transmitter circuitry configured to transmit the pause notification message to the radio access network over the radio interface.

Example Embodiment 22: The wireless terminal of Example Embodiment 20, wherein the at least first message commands either a download of a model for the Artificial Intelligence/Machine Learning (AI/ML) Functionality/feature or a reconfiguration of the Artificial Intelligence/Machine Learning (AI/ML) Functionality/feature.

Example Embodiment 23: The wireless terminal of Example Embodiment 20, wherein the at least first message notifies the wireless terminal that an update is available from the radio access network for a model for the Artificial Intelligence/Machine Learning (AI/ML) Functionality/feature.

Example Embodiment 24: The wireless terminal of claim 20, wherein the processor circuitry is configured to determine that the update or the download is required when the first message commands one of the following:

(i) reconfiguration in a case of a functionality-based Life Cycle Management (LCM)

(ii) a model update in a case of Model-based Life Cycle Management (LCM);

(iii) a model change in a case of Model-based Life Cycle Management (LCM);

(iv) a change detected by the wireless terminal.

Example Embodiment 25: The wireless terminal of Example Embodiment 21, wherein the processor circuitry is configured to determine at least an approximate magnitude of the pause and to include the approximate magnitude in the pause notification message.

Example Embodiment 26: The wireless terminal of Example Embodiment 21, wherein the processor circuitry is configured to include in the pause notification message an indication of a cause of the pause.

Example Embodiment 27: The wireless terminal of Example Embodiment 21, wherein the receiver circuitry is configured to receive a scheduling message from the radio access network after transmission of the pause notification message, and wherein the processor circuitry is configured to initiate the pause or stop/cancel of the update of the existing model or the download of the new model according to a scheduling of the scheduling message.

Example Embodiment 28: The wireless terminal of Example Embodiment 20, wherein upon making the determination the processor circuitry is configured to initiate the update of the existing model or the download of the new model.

Example Embodiment 29: The wireless terminal of Example Embodiment 28, wherein the processor circuitry is configured fallback to legacy operation while performing an update of the existing model or a download of the new model.

Example Embodiment 30: The wireless terminal of Example Embodiment 28, wherein the processor circuitry is configured to set a timer according to the timer value and to determine whether the update of the existing model or download of the new model is completed before expiration of the timer.

Example Embodiment 31: The wireless terminal of Example Embodiment 30, wherein when the processor circuitry determines that the update of the existing model or download of the new model is not completed before expiration of the timer, the processor circuitry generates a failure message and performs one of the following:

maintains an existing configuration for the Artificial Intelligence/Machine Learning (AI/ML) Functionality;

falls back to legacy operation;

requests another configuration for the Artificial Intelligence/Machine Learning (AI/ML) Functionality/feature from the radio access network;

wherein the transmitter circuitry is further configured to transmit the failure message to the radio access network.

Example Embodiment 22: The wireless terminal of Example Embodiment 30, wherein:

the receiver circuitry is configured to receive a failure operation instruction message from the radio access network; and when the processor circuitry determines that the update of the existing model or download of the new model is not completed before expiration of the timer, the processor circuitry operates in accordance with the failure operation instruction.

Example Embodiment 33: The wireless terminal of Example Embodiment 30, wherein the receiver circuitry is further configured to receive, over the radio interface from the radio access network, at timer message comprising the timer value, and wherein the processor circuitry is configured to set the timer according to the timer value and to determine whether the update of the existing model or download of the new model is completed before expiration of the timer.

Example Embodiment 34: The wireless terminal of Example Embodiment 20, the processor circuitry is configured to make a determination that the reception of the first message requires the update or the download of plural models associated with the Artificial Intelligence/Machine Learning (AI/ML) Functionality/feature.

Example Embodiment 35: A method in a wireless terminal which communicates over a radio interface with a radio access network, the method comprising:

receiving, over the radio interface from the radio access network, at least a first message which concerns implementation of an Artificial Intelligence/Machine Learning (AI/ML) Functionality/feature for the wireless terminal;

making a determination that the reception of the first message requires one of the following:
(1) an update of an existing model for the Artificial Intelligence/Machine Learning (AI/ML) Functionality/feature;
(2) a download of a new model for the Artificial Intelligence/Machine Learning (AI/ML) Functionality/feature for a particular functionality or feature;

making a determination that a pause may be necessary for implementation of the Artificial Intelligence/Machine Learning (AI/ML) Functionality/feature.

Example Embodiment 36: The method of Example Embodiment 35, further comprising:

generating a pause notification message configured to notify the radio access network to pause implementation of the Artificial Intelligence/Machine Learning (AI/ML) Functionality/feature; and transmitting the pause notification message to the radio access network over the radio interface.

Example Embodiment 37: A network including one or more nodes which comprises:

processor circuitry configured to generate at least a first message which one of the following:
(1) an update of an existing model for the Artificial Intelligence/Machine Learning (AI/ML) Functionality/feature;
(2) a download of a new model for the Artificial Intelligence/Machine Learning (AI/ML) Functionality/feature for a particular functionality or feature;

interface circuitry configured to transmit the first message to a wireless terminal over a radio interface and to receive from the wireless terminal over the radio interface a pause notification message configured to notify the network to pause implementation of the update of the existing model or the download of the new model.

Example Embodiment 38: The network of Example Embodiment 37, wherein upon receipt of the pause notification message the processor circuitry performs one of the following:

accepts a pause included in the pause notification message;

generates a scheduling message which comprises a scheduling instruction which provides the wireless terminal with scheduling information for the wireless terminal to perform the pause of the update of the existing model or the download of the new model;

generates a failure operation instruction message which prescribes actions to be performed by the wireless terminal in the event that the update of the existing model or download of the new model is not timely completed.

Figure 1:
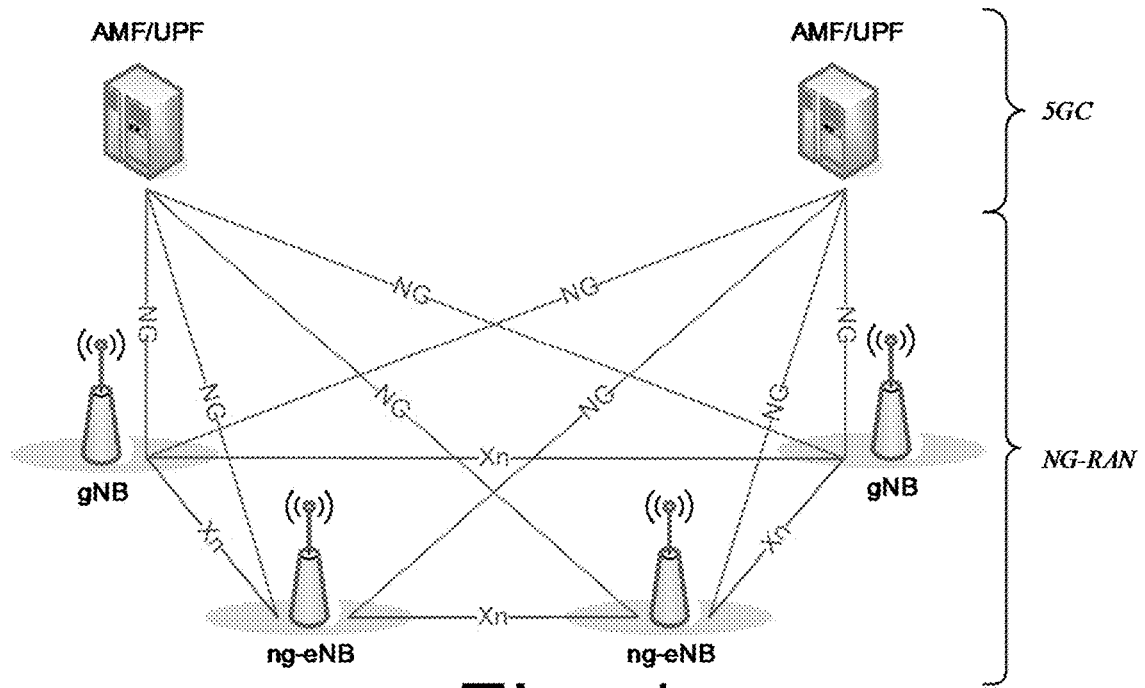
FIG. 1 is a diagrammatic view of overall architecture for a 5G New Radio system.
Figure 11:
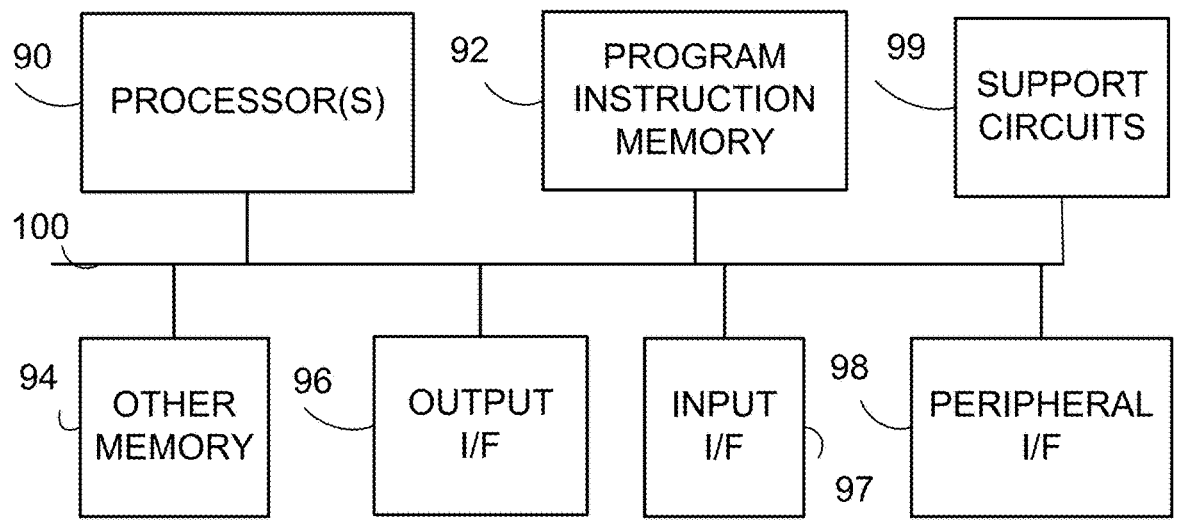
FIG. 11 is a diagrammatic view showing example elements comprising electronic machinery which may comprise a wireless terminal, a radio access node, and a core network node according to an example embodiment and mode.

Certain units and functionalities of the systems 20 may be implemented by electronic machinery. For example, electronic machinery may refer to the processor circuitry described herein, such as terminal processor circuitry 60, core network node processor(s) 70, AND access node processor(s) 80. Moreover, the term "processor circuitry" is not limited to mean one processor, but may include plural processors, with the plural processors operating at one or more sites. Moreover, as used herein the term "server" is not confined to one server unit but may encompass plural servers and/or other electronic equipment and may be co-located at one site or distributed to different sites. With these understandings, FIG. 11 shows an example of electronic machinery, e.g., processor circuitry, as comprising one or more processors 90, program instruction memory 92; other memory 94 (e.g., RAM, cache, etc.); input/output interfaces 96 and 97; peripheral interfaces 98; support circuits 99; and busses 100 for communication between the aforementioned units. The processor(s) 90 may comprise the processor circuitries described herein, for example, wireless terminal processor(s) 60, core network node processor(s) 70, access node processor(s) 80, or any processor(s) of a network entity of the core network.

A memory or register described herein may be depicted by memory 94, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 99 are coupled to the processors 90 for supporting the processor in a conventional manner. These circuits include cache, power supplies, clock circuits, input/output circuitry and subsystems, and the like.

The term "configured" may relate to the capacity of a device whether the device is in an operational or non-operational state. Configured may also refer to specific settings in a device that affect the operational characteristics of the device whether the device is in an operational or nonoperational state. In other words, the hardware, software, firmware, registers, memory values, and/or the like may be "configured" within a device, whether the device is in an operational or nonoperational state, to provide the device with specific characteristics.

An interface may be a hardware interface, a firmware Interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided using hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

The technology of the example embodiments and modes described herein encompasses a non-transitory computer readable medium encoded with a computer program that, when executed by a computer or processor of the wireless terminal described herein, causes the computer to implement the acts described herein, and/or a non-transitory computer readable medium encoded with a computer program that, when executed by a computer or processor of the mobile base station relay described herein, causes the computer to implement the acts described herein.

Moreover, each functional block or various features of the wireless terminals and nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves operation of wireless terminals with artificial intelligence/ machine learning model capability.

One or more of the following documents may be pertinent to the technology disclosed herein (all of which are incorporated herein by reference in their entirety):

3GPP TSG RAN WG1, R1-230xxxx, #113, Incheon, Korea, May 22-May 26, 2023, Session notes for 9.2 (Study on AI/ML for NR air interface).

3GPP TSG-RAN WG2 Meeting #122R2-2xxxxxx, Incheon, Korea, May 22-26, 2023, Source: RAN2 Chairman (MediaTek), Title: Chair Notes 3GPP TSG-RAN WG1 Meeting #113, R1-2305327, Incheon, KR, May 22-May 26, 2023, Agenda item: 9.2.1, Source: Qualcomm Incorporated, Title: General Aspects of AI/ML Framework Although the description above contains many specificities, these should not be construed as limiting the scope of the technology disclosed herein but as merely providing illustrations of some of the presently preferred embodiments of the technology disclosed herein. Thus, the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A wireless terminal which communicates over a radio interface with a network node, the wireless terminal comprising:
   receiver circuitry configured to receive, over the radio interface from the network node, at least a first message which concerns implementation of an Artificial Intelligence/Machine Learning (AI/ML) Functionality/feature for the wireless terminal;
   processor circuitry configured:
   (a) to make a determination that the reception of the first message requires one of the following:
      (1) an update of an existing model for the Artificial Intelligence/Machine Learning (AI/ML) Functionality/feature;
      (2) a download of a new model for the Artificial Intelligence/Machine Learning (AI/ML) Functionality/feature for a particular functionality or feature;
   (b) to make a determination that a pause maybe necessary to implement the Artificial Intelligence/Machine Learning (AI/ML) Functionality/feature.

2. The wireless terminal of claim 1, wherein the processor circuitry is further configured to generate a pause notification message configured to notify the network node to pause implementation of the Artificial Intelligence/Machine Learning (AI/ML) Functionality/feature; and wherein the wireless terminal comprises transmitter circuitry configured to transmit the pause notification message to the network node over the radio interface.

3. The wireless terminal of claim 1, wherein the at least first message commands either a download of a model for the Artificial Intelligence/Machine Learning (AI/ML) Functionality/feature or a reconfiguration of the Artificial Intelligence/Machine Learning (AI/ML) Functionality/feature.

4. The wireless terminal of claim 1, wherein the at least first message notifies the wireless terminal that an update is available from the network node for a model for the Artificial Intelligence/Machine Learning (AI/ML) Functionality/feature.

5. The wireless terminal of claim 2, wherein the processor circuitry is configured to determine at least an approximate magnitude of the pause and to include the approximate magnitude in the pause notification message.

6. The wireless terminal of claim 2, wherein the receiver circuitry is configured to receive a scheduling message from the network node after transmission of the pause notification message, and wherein the processor circuitry is configured to initiate the pause or stop/cancel of the update of the existing model or the download of the new model according to a scheduling of the scheduling message.

7. The wireless terminal of claim 1, wherein upon making the determination the processor circuitry is configured to initiate the update of the existing model or the download of the new model.

8. The wireless terminal of claim 7, wherein the processor circuitry is configured fallback to legacy operation while performing an update of the existing model or a download of the new model.

9. The wireless terminal of claim 7, wherein the processor circuitry is configured to set a timer according to the timer value and to determine whether the update of the existing model or download of the new model is completed before expiration of the timer.

10. The wireless terminal of claim 9, wherein when the processor circuitry determines that the update of the existing model or download of the new model is not completed before expiration of the timer, the processor circuitry generates a failure message and performs one of the following:
    maintains an existing configuration for the Artificial Intelligence/Machine Learning (AI/ML) Functionality;
    falls back to legacy operation;
    requests another configuration for the Artificial Intelligence/Machine Learning (AI/ML) Functionality/feature from the network node;
    wherein the transmitter circuitry is further configured to transmit the failure message to the network node.

11. The wireless terminal of claim 9, wherein:
    the receiver circuitry is configured to receive a failure operation instruction message from the network node; and
    when the processor circuitry determines that the update of the existing model or download of the new model is not completed before expiration of the timer, the processor circuitry operates in accordance with the failure operation instruction.

12. The wireless terminal of claim 1, the processor circuitry is configured to make a determination that the reception of the first message requires the update or the download of plural models associated with the Artificial Intelligence/Machine Learning (AI/ML) Functionality/feature.

13. A method in a wireless terminal which communicates over a radio interface with a network node, the method comprising:
    receiving, over the radio interface from the network node, at least a first message which concerns implementation of an Artificial Intelligence/Machine Learning (AI/ML) Functionality/feature for the wireless terminal;

making a determination that the reception of the first message requires one of the following:
(1) an update of an existing model for the Artificial Intelligence/Machine Learning (AI/ML) Functionality/feature;
(2) a download of a new model for the Artificial Intelligence/Machine Learning (AI/ML) Functionality/feature for a particular functionality or feature;

making a determination that a pause may be necessary for implementation of the Artificial Intelligence/Machine Learning (AI/ML) Functionality/feature.

14. A network including one or more nodes which comprises:
processor circuitry configured to generate at least a first message which one of the following:
(1) an update of an existing model for the Artificial Intelligence/Machine Learning (AI/ML) Functionality/feature;
(2) a download of a new model for the Artificial Intelligence/Machine Learning (AI/ML) Functionality/feature for a particular functionality or feature;

interface circuitry configured to transmit the first message to a wireless terminal over a radio interface and to receive from the wireless terminal over the radio interface a pause notification message configured to notify the network to pause implementation of the update of the existing model or the download of the new model.

15. The network of claim 14, wherein upon receipt of the pause notification message the processor circuitry performs one of the following:
accepts a pause included in the pause notification message;
generates a scheduling message which comprises a scheduling instruction which provides the wireless terminal with scheduling information for the wireless terminal to perform the pause of the update of the existing model or the download of the new model;
generates a failure operation instruction message which prescribes actions to be performed by the wireless terminal in the event that the update of the existing model or download of the new model is not timely completed.

* * * * *